US008587818B2

(12) United States Patent
Imaizumi et al.

(10) Patent No.: US 8,587,818 B2
(45) Date of Patent: Nov. 19, 2013

(54) CAPTURED IMAGE PROCESSING SYSTEM AND RECORDING MEDIUM

(75) Inventors: Daisaku Imaizumi, Osaka (JP); Makoto Hayasaki, Osaka (JP); Kazuyuki Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 644 days.

(21) Appl. No.: 12/851,839

(22) Filed: Aug. 6, 2010

(65) Prior Publication Data

US 2011/0032570 A1 Feb. 10, 2011

(30) Foreign Application Priority Data

Aug. 7, 2009 (JP) ................................. 2009-185036
Jun. 1, 2010 (JP) ................................. 2010-126166

(51) Int. Cl.
*G06F 3/12* (2006.01)

(52) U.S. Cl.
USPC ......... 358/1.18; 358/1.15; 358/537; 358/538; 348/207.99; 348/207.2; 348/222.1

(58) Field of Classification Search
USPC ........... 358/1.15, 1.18, 537, 538; 348/207.99, 348/207.2, 222.1
See application file for complete search history.

(56) References Cited

U.S. PATENT DOCUMENTS

| 7,593,603 B1 * | 9/2009 | Wilensky ........................ 382/311 |
| 7,777,785 B2 * | 8/2010 | Akasawa .................... 348/222.1 |
| 2001/0022624 A1 * | 9/2001 | Tanaka et al. ............ 348/333.02 |
| 2002/0118292 A1 * | 8/2002 | Baron ........................... 348/335 |
| 2004/0003052 A1 | 1/2004 | Yoda |
| 2004/0189807 A1 * | 9/2004 | Smith ......................... 348/207.1 |
| 2005/0212925 A1 * | 9/2005 | Lefebure et al. ........... 348/222.1 |
| 2008/0136833 A1 * | 6/2008 | Taniguchi et al. ............. 345/581 |

FOREIGN PATENT DOCUMENTS

| JP | 2001-177716 A | 6/2001 |
| JP | 2002-41502 A | 2/2002 |
| JP | 2005-275787 A | 10/2005 |
| JP | 2005-303941 A | 10/2005 |
| JP | 2006-237757 A | 9/2006 |
| JP | 2007-282257 A | 10/2007 |

OTHER PUBLICATIONS

C. Tomasi et al., "Bilateral Filtering for Gray and Color Images", Proceedings of the 1998 IEEE International Conference on Computer Vision, Bombay India.

(Continued)

*Primary Examiner* — King Poon
*Assistant Examiner* — Lawerence Wills
(74) *Attorney, Agent, or Firm* — Birch, Stewart, Kolasch & Birch, LLP

(57) ABSTRACT

A captured image processing system is provided. The captured image processing system includes a portable terminal apparatus and an image output apparatus, each of which are communicable with the other. The portable terminal apparatus captures an image of an object and transmits output target image data obtained by capturing the image to the image output apparatus so as to cause output of this captured image from the image output apparatus. The image output apparatus carries out image processing to the received output target image data, and outputs (a) corrected image data, or (b) an image indicated by the corrected image data. The captured image processing system allows easy output of necessary regions included in an image captured by the portable terminal apparatus, and allows output of an image having no geometric distortion even if image capture is carried out obliquely with respect to a captured image object.

18 Claims, 20 Drawing Sheets

UNPROCESSED DESIGNATED REGION IMAGE

GEOMETRICALLY CORRECTED DESIGNATED REGION IMAGE

(56) References Cited

OTHER PUBLICATIONS

Masayuki Tanaka et al., "Super-resolution: High-resolution Image Reconstruction from Multiple Low-resolution Images", ITE Journal vol. 62, No. 3, pp. 337-342 (2008).

Takahiro Saito et al., "Super-Resolution Oversampling from a Single Image", ITE Journal, vol. 62, No. 2, pp. 181-189 (2008), The Institute of Image Information and Television Engineers.

* cited by examiner

FIG. 4

| tan Θ | Θ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| ⋮ | ⋮ |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

| 0 | -1 | 0 |
|---|---|---|
| -1 | 4 | -1 |
| 0 | -1 | 0 |

| MN | 0 |
|---|---|
| MN+$\Delta$ | 1 |
| MN+$\Delta \times 2$ | 2 |
| MN+$\Delta \times 3$ | 3 |
| MN+$\Delta \times 4$ | 4 |
| : | : |
| : | : |
| MN+$\Delta \times 255$ | 255 |

$\Delta = (MX-MN)/255$

UNPROCESSED DESIGNATED REGION IMAGE

GEOMETRICALLY CORRECTED DESIGNATED REGION IMAGE

| COORDINATE | DETECTED EDGE SHAPE |
|---|---|
| P 1 | ⌈ |
| P 2 | ⌉ |
| P 3 | ⌊ |
| P 4 | ⌋ |

FIG. 24 (a)

$A = ((1) + (5))/2$
$B = (9 \times (2) + 4 \times (6))/13$
$C = (9 \times (4) + 4 \times (8))/13$

$A = ((1) + (2) + (4))/3$
$B = (9 \times (2) + 4 \times (4))/13$
$C = (4 \times (2) + 9 \times (4))/13$

CAPTURED IMAGE PROCESSING SYSTEM AND RECORDING MEDIUM

This Nonprovisional application claims priority under 35 U.S.C. §119(a) on Patent Application No. 2009-185036 filed in Japan on Aug. 7, 2009, and Patent Application No. 2010-126166 filed in Japan on Jun. 1, 2010, the entire contents of which are hereby incorporated by reference.

TECHNICAL FIELD

The present invention relates to a captured image processing system which outputs an image captured by a portable terminal apparatus, by use of an image output apparatus.

BACKGROUND ART

With the development of Internet technology, chances are increasing to capture images by use of a portable terminal apparatus such as a mobile phone and to store such captured images. Not only landscapes and people, but also explanation diagrams and descriptions displayed in various shows, and furthermore slides displayed in an academic conference or the like are now being more regarded a target for image capture. Generally, when such images captured by use of the portable terminal apparatus are stored, the images are stored with an automatically-provided file name based on information such as an image capture date or the like or stored with a file name created by a user themselves.

Moreover, Patent Literature 1 discloses a technique which allows a user to transmit digital image data to a server through a network, which digital image data is collected by use of a digital camera or a portable terminal apparatus such as a PDA or mobile personal computer having a built-in camera. In this technique, the server edits received digital image data so that the digital image data is compatible to a given document format, and pastes this edited digital image data to a given region in the document format as an audio code image or text image. Thereafter, this document is, for example, stored in a recording medium as a report for a specific purpose, printed out as a paper document, or transmitted to a specific site through a network.

CITATION LIST

Patent Literature

Patent Literature 1
Japanese Patent Application Publication, Tokukai, No. 2002-41502 A (Publication Date: Feb. 8, 2002)

SUMMARY OF INVENTION

Technical Problem

However, in a case where an image is captured by use of a mobile phone or digital camera, image capture of a desired image capture object having a rectangular shape such as a document or poster may not always be carried out from its front side, and the image capture object may not always be image captured so that the desired image capture object fills an entire frame of the mobile phone or digital camera. As a result, there are cases where a captured image includes unnecessary information other than the image capture object, for example, a case where faces of people that are present around the image capture object become included in the screen.

Furthermore, there may be a case where the desired image capture object can only be captured obliquely, not from the front side of the desired image capture object. Since the image capture object is of a rectangular shape, when the image capture object is captured obliquely, end sides of the image capture object skews in the image. This causes including of unnecessary items around the desired image capture object.

A captured image obtained as such may be used as it is, however in order to organize points in the image to make it easily understandable, it is preferable to cut out just the necessary parts of the image. Although Patent Literature 1 discloses carrying out adjustment and the like to brightness, color, and size, and also discloses to enlarge or shrink image data so that the image data is inscribed in a template area, it does not disclose extraction of just necessary parts in the image. Moreover, in a case where image capture of the rectangular-shaped image capture object is carried out obliquely, the image capture object becomes displayed as a distorted quadrangle in the captured image (geometric distortion).

The present invention is accomplished in view of the foregoing problem, and its object is to provide a captured image processing system, an image output method, and a recording medium, each of which allows easy output of a necessary region in an image that is captured by use of a portable terminal apparatus, and which allows outputting an image having no geometric distortion even if image capture is carried out obliquely with respect to an image capture object having a rectangular shape.

Solution to Problem

In order to attain the object, a captured image processing system of the present invention including (i) a portable terminal apparatus including an image capture section and (ii) an image output apparatus, the portable terminal apparatus and the image output apparatus being communicable with each other, is a captured image processing system including: a designation information accepting section for accepting entry of designation information from a user, the designation information being indicative of a location of a designation region which is a partial region of a captured image indicated by captured image data, the captured image data being obtained by carrying out image capture using the image capture section; an output target region determination section for determining an output target region in the captured image based on the designation information, the output target region being a region to be outputted from the image output apparatus; a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region; a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, the portable terminal apparatus including at least the designation information accepting section, and the image output apparatus including at least the corrected-data preparation section and the output section.

Moreover, in order to attain the object, a captured image processing system of the present invention including (i) a portable terminal apparatus including an image capture section and (ii) an image output apparatus, the portable terminal apparatus and the image output apparatus being communicable with each other, is a captured image processing system including: a designation information accepting section for accepting entry of designation information from a user, the designation information being indicative of a location of a designation region which is a quadrangle-shaped partial region of a captured image indicated by captured image data, the captured image data being obtained by carrying out image capture using the image capture section; an output target region determination section for determining an output target region in the captured image based on the designation information, the output target region being a quadrangle-shaped region to be outputted from the image output apparatus; a mapping preparation section for obtaining a mapping to be used to convert (a) the quadrangle-shaped output target region determined by the output target region determination section to (b) a rectangular region of a given size and having upper and lower sides of the rectangular region being substantially parallel in a horizontal direction, the mapping being used for converting coordinates of each of pixel electrodes within the output target region to coordinates of respective pixels in the rectangular region; a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, the portable terminal apparatus including at least the designation information accepting section, and the image output apparatus including at least the corrected-data preparation section and the output section.

Advantageous Effects of Invention

According to the present invention, it is possible to easily output a necessary region in an image captured by a portable terminal apparatus, and is possible to output an image having no geometric distortion even if image capture is carried out obliquely with respect to an image capture object having a rectangular shape.

BRIEF DESCRIPTION OF DRAWINGS

FIG. 4 shows angles of a skew θ and their respective tangents which angles and tangents are obtained in the example of detection of the skew which example is illustrated in FIG. 3.

FIG. 24(a) is a view illustrating a method for calculating pixel values of the interpolated pixels in a case where an edge direction is an upper left-lower right direction.

FIG. 24(b) is a view illustrating a method for calculating the pixel values of the interpolated pixels in a case where the edge direction is a left-right direction.

FIG. 24(c) is a view illustrating a method for calculating the pixel values of the interpolated pixels in a case where the edge direction is an upper right-lower left direction.

FIG. 24(d) is a view illustrating a method for calculating the pixel values of the interpolated pixels in a case where the edge direction is an upper-lower direction.

DESCRIPTION OF EMBODIMENTS

An embodiment of the present invention is described below in detail.

(1) Overall Arrangement of Captured Image Processing System

Figure 1:
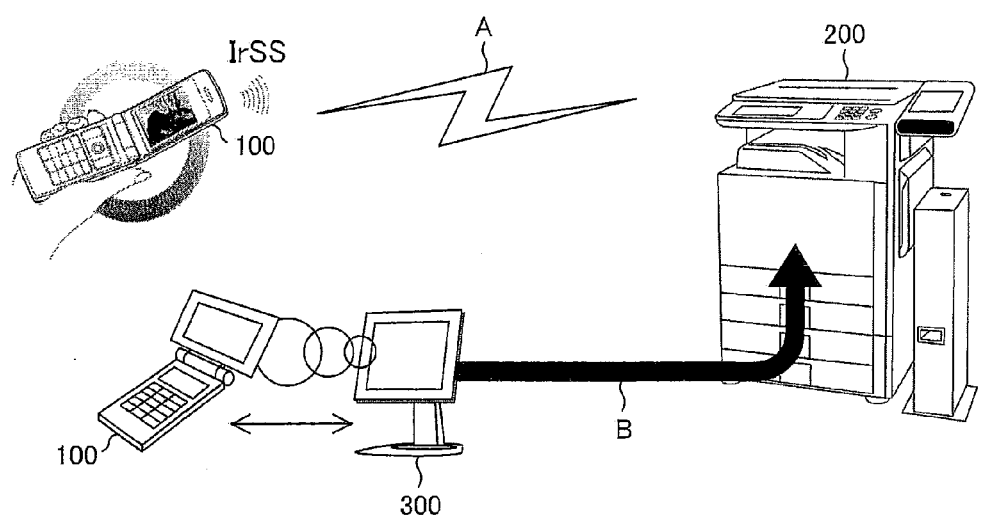
FIG. 1 is a drawing illustrating an entire arrangement of a captured image processing system in accordance with one embodiment of the present invention.

FIG. 1 is a view illustrating an overall arrangement of a captured image processing system of the present invention.

The captured image processing system includes (i) a portable terminal apparatus 100 including image capture means such as a camera-equipped mobile phone or a digital camera and (ii) an image output apparatus 200 such as a multifunction printer or a printer (an image forming apparatus) (see FIG. 1).

The portable terminal apparatus 100 is carried with a user. The user can cause the portable terminal apparatus 100 to carry out image capture with respect to an object in various scenes.

According to the present embodiment, the portable terminal apparatus 100 has a function of a text image capture mode which (i) captures an image of an image capture object (an object whose image is to be captured) having a rectangular shape such as (a) paper or a poster on which a text image is printed or (b) a display screen on which a text image is displayed (e.g., a display screen and a screen projected by a projector), so as to cause output, from the image output apparatus 200, of this captured image obtained by the image capture. Namely, the portable terminal apparatus 100 transmits, to the image output apparatus 200, image data which is obtained by capturing an image in the text image capture mode and which is to be outputted from the image output apparatus 200 (hereinafter referred to as output target image data). Further, the image output apparatus 200 carries out a given image processing to the received output target image data, and outputs (a) the output target image data which has been subjected to the image processing (hereinafter referred to as corrected image data), or (b) an image indicated by the corrected image data.

Moreover, the portable terminal apparatus 100 is capable of accepting designation of a region to be outputted in a captured image (hereinafter, referred to as output target region). This allows a user to cause output from the image output apparatus 200 of an image in which just a necessary region in the captured image is extracted.

Note also that it is not always possible for the user to carry out image capture from the front with respect to the image capture object which has a rectangular shape, such as (a) paper or a poster on which a text image is printed or (b) a display screen on which the text image is displayed. Namely, the user may obliquely carry out image capture with respect to the image capture object, in a state where (i) a normal direction of a plane of the image capture object on which plane the text image is formed and (ii) a direction in which image capture means carries out the image capture do not coincide with each other. In this case, the image capture object undergoes a distortion (hereinafter referred to as a geometric distortion) in the captured image. The present embodiment is arranged to cause the image output apparatus 200 to output an image, in which such a geometric distortion has been corrected, in a case where the text image capture mode is selected.

Furthermore, according to the present embodiment, the image output apparatus 200 carries out high resolution correction for improving resolution of the output target image data received from the portable terminal apparatus 100. Examples of how the high resolution correction is carried out include a method disclosed in Journal of the Institute of Image Information and Television Engineers, Vol. 62, No. 3, pp. 337-342 (2008), which method uses a plurality of pieces of captured image data, and also includes a method disclosed in Journal of the Institute of Image Information and Television Engineers, Vol. 62, No. 2, pp. 181-189 (2008), which method uses one captured image data. Any of these methods are usable. Note that in the present embodiment, explanation is provided as a case where high resolution correction is carried out by use of output target image data obtained by carrying out consecutive image capture a plurality of times to one object. However, the present invention is not limited to the case where the image output apparatus 200 has the high resolution function.

Output processes that are carried out by the image output apparatus 200 encompass: a printing process for printing and outputting an image indicated by the corrected image data; a filing process for storing the output target image data to a server or a storage device (e.g. USB memory); and an e-mail transmission process for transmitting an e-mail to which corrected image data is attached.

The portable terminal apparatus 100, which can communicate with the image output apparatus 200, transmits the output target image data to the image output apparatus 200, as described above. Examples of communications used between the portable terminal apparatus 100 and the image output apparatus 200 are as illustrated by reference signs A and B in FIG. 1. The system illustrated by reference sign A is a wireless communication system based on any one of infrared communication standards such as IrSimple. The system illustrated by reference sign B is a system in which the output target image data is once transmitted from the portable terminal apparatus 100 to a relay apparatus 300 through a non-contact wireless communication such as Felica (registered trademark). Thereafter, the output target image data is forwarded to the image output apparatus 200 from the relay apparatus 300 by use of a wireless communication such as Bluetooth (registered trademark). In the present embodiment, the user is to come in front of the image output apparatus 200 and operate the portable terminal apparatus 100 to cause transmission of data to the image output apparatus 200 from the portable terminal apparatus 100 by use of a short-distance wireless communication such as infrared communication.

Note that not only the foregoing communication systems but also a system employing a publicly-known method is applicable to the communication between the portable terminal apparatus 100 and the image output apparatus 200. For example, the output target image data may be transmitted to the image output apparatus 200 by attaching the output target image data to an e-mail.

(2) Arrangement of Portable Terminal Apparatus

Figure 2:
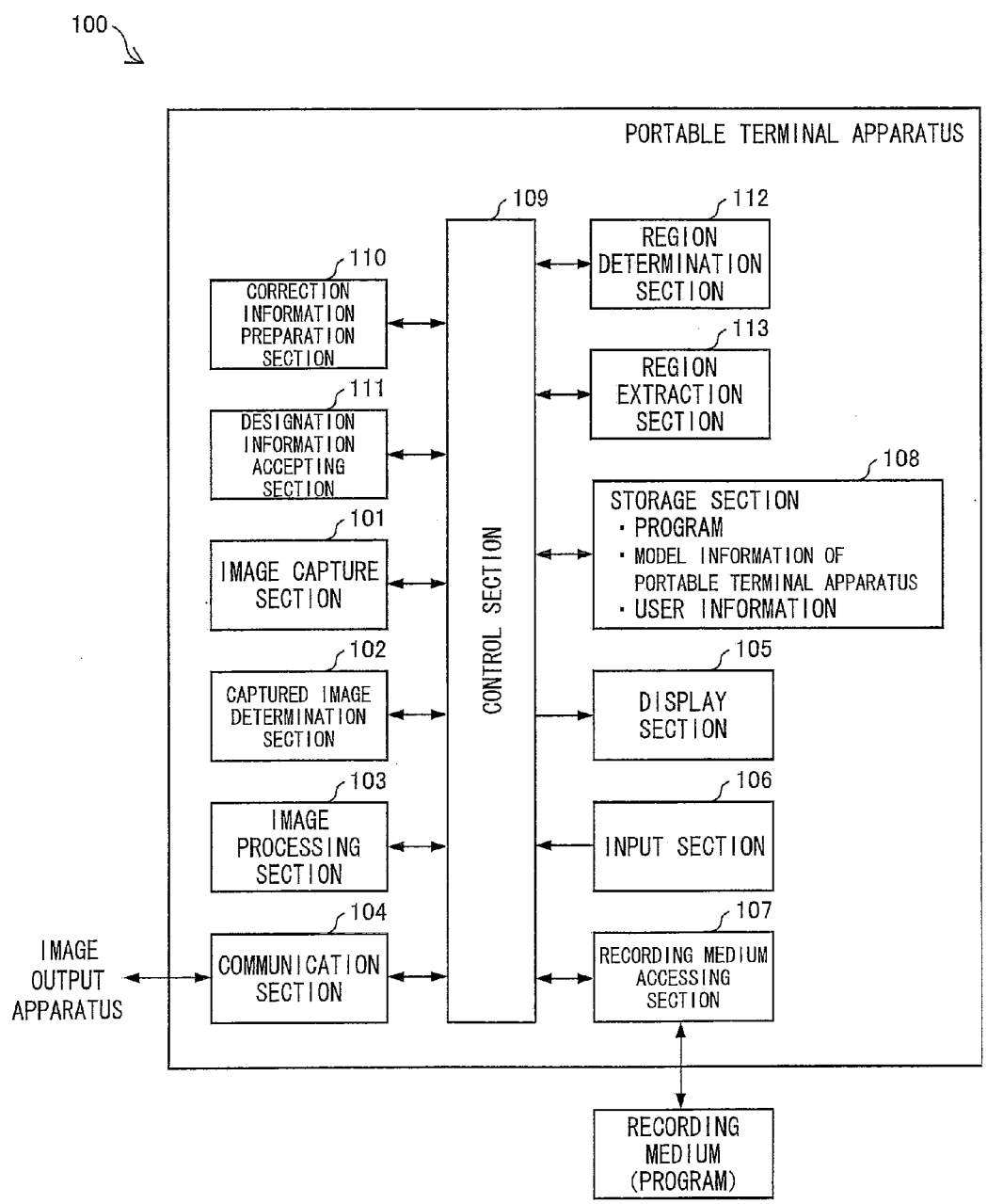
FIG. 2 is a block diagram illustrating an arrangement of a portable terminal apparatus in accordance with one embodiment of the present invention.

First, the portable terminal apparatus 100 of the present embodiment is described below with reference to FIG. 2. FIG. 2 is a block diagram illustrating an arrangement of the portable terminal apparatus 100. The portable terminal apparatus 100 includes an image capture section 101, a captured image determination section (correction information preparation section) 102, an image processing section 103, a communication section (transmission section) 104, a display section 105, an input section 106, a recording medium accessing section 107, a storage section 108, a control section (transmission section) 109, a correction information preparation section 110, a designation information accepting section 111, a region determination section (output target region determination section) 112, and a region extraction section (image extraction section) 113.

The image capture section 101 carries out image capture with respect to an image capture object by use of a CCD/CMOS sensor so that a captured image has a predetermined resolution. In a case where the text image capture mode is selected by the user, a single shutter click causes the image capture section 101 to consecutively carry out, more than once (e.g., 2 to 15 times), image capture with respect to the image capture object. Images consecutively captured are generally substantially identical, but will be offset by a minutely small amount due to a camera shake or the like.

In the following description, image data that indicates a respective one of the plurality of pieces of captured images obtained by the consecutive image capture by the image capture section 101 upon the single shutter click, is referred to as sub-captured image data. Moreover, a set of a plurality of the sub-captured image data, which set is obtained by the consecutive image capture with the image capture section 101 upon the single shutter click, is referred to as a captured image data set. Further, an entire image indicated by the captured image data is referred to as a captured image.

While the text image capture mode is being selected, the captured image determination section 102 determines whether or not the plurality of captured images obtained by the consecutive image capture by the image capture section 101 meet given process execution requirements that include a requirement for causing the image output apparatus 200 to carry out the high resolution correction. The captured image determination section 102 supplies a determined result to the control section 109. Processes carried out by the captured image determination section 102 are described later in detail.

The image processing section 103 carries out at least an A/D conversion process with respect to the data of the image captured by the image capture section 101 (sub-captured image data).

The communication section 104 has functions of serial/parallel transfer and wireless data communication, which are in conformity with USB (Universal Serial Bus) 1.1 or USB 2.0 Standard. In accordance with transmission instructions entered by the user, the communication section 104 transmits, to the image output apparatus 200, the output target image data to be outputted from the image output apparatus 200.

The display section 105 is realized by a liquid crystal display device, for example. The input section 106, which has a plurality of buttons, serves as a section from which the user enters data.

The recording medium accessing section 107 reads out a program for carrying out the processes in the portable terminal apparatus 100 from a recording medium in which the program is recorded.

The storage section 108 serves as a section in which (i) the program for carrying out the processes in the portable terminal apparatus 100, (ii) information on a model of the portable terminal apparatus 100, (iii) user information, and (iv) data required for carrying out the processes are stored. Note that the user information refers to information for identifying the user of the portable terminal apparatus 100, such as a user ID and a password. The storage section 108 also stores (v) the captured image data set obtained by carrying out image capture in the text image capture mode and (vi) annex information of the captured image data set (e.g. geometric correction information, output process information, file name).

The correction information preparation section 110 prepares, per captured image data set, information (geometric correction information) for correcting skew and geometric distortion of the image capture object having a rectangular shape in the image indicated by the captured image data set. The correction information preparation section 110 causes the storage section 108 to store the geometric correction information prepared per captured image data set so that the geometric correction information is associated with the captured image data set. Specific details of processes carried out in the correction information preparation section 110 are later described in detail.

The designation information accepting section 111 accepts designation information used for determining the output target region to be outputted by the image output apparatus 200 among the images indicated by the captured image data sets.

In the embodiment, the designation information is information indicative of a position of a region (designated region) in the captured image that is designated by the user as the output target region. The region determination section 112 determines the output target region in the captured image based on the designation information accepted by the designation information accepting section 111. Specific details of processes carried out in the designation information accepting section 111 and region determination section 112 are later described.

The region extraction section 113 cuts out, from the sub-captured image data included in the captured image data sets, the output target region determined by the region determination section 112, and thereafter causes the storage section 108 to store sets of the plurality of pieces of image data (hereinafter referred to as sub-designated region image data) so that the sub-designated region image data is associated with the respective captured image data set. Note that in the following description, a set of the plurality of pieces of sub-designated region image data prepared from one captured image data set is referred to as a designated region image data set. The region extraction section 113 causes the storage section 108 to store the prepared designated region image data set so that the prepared designated region image data set is associated with the captured image data set.

The control section 109 carries out control with respect to the sections of the portable terminal apparatus 100. Specifically, in a case where an instruction to select the text image capture mode is entered to the input section 106, the control section 109 causes the display section 105 to display a window which urges the user to enter, from the input section 106, a magnification of resolution conversion. Subsequently, the control section 109 determines, in accordance with the magnification (e.g., ×2 or ×4) entered from the input section 106, (i) the number of consecutive times of image capture carried out by the image capture section 101 and (ii) a part of the process execution requirements which is used in the captured image determination section 102. Note that the control section 109 determines the above (i) and (ii) in accordance with information, preliminarily stored in the storage section 108, in which the magnification, the number of times of image capture, and the part of the process execution requirements are associated with each other.

Further, in the case where the instruction to select the text image capture mode is entered from the input section 106, the control section 109 causes the display section 105 to display a window which urges the user to enter, from the input section 106, (i) an instruction to select a kind of the output process (such as the printing process, the filing process, the e-mail transmission process, or the like) to be carried out by the image output apparatus 200 and (ii) a setting requirement for carrying out a selected output process (a printing requirement such as the number of sheets to be printed, an address of a server at which data is to be filed, an address of a destination at which an e-mail is transmitted, or the like). Subsequently, the control section 109 receives output process information indicative of the kind of the output process and the setting requirement for carrying out the output process.

The control section 109 attaches (i) a file name and (ii) the output process information to the captured image data determined by the captured image determination section 102 as meeting the process execution requirements, and causes the storage section 108 to store this captured image data. At this time, the control section 109 attaches, to the captured image data set, a flag (hereinafter referred to as unoutputted flag) indicating that the captured image data set has not yet been transmitted to the image output apparatus 200.

Moreover, after a transmission instruction is entered into the input section 106, the control section 109 specifies a respective output target image data set for each of the captured image data sets stored in the storage section 108, and causes the communication section 104 to carry out a transmission process to transmit the output target image data set to the image output apparatus 200. At this time, together with the output target image data set, the communication section 104 transmits to the image output apparatus 200 the information being associated with the captured image data sets, which information are the file name, output process information, geometric correction information, and information of the model and user information stored in the storage section 108. In a case where the designated region image data set is associated with the captured image data set, the control section 109 causes the designated region image data set to serve as the output target image data set, and in a case where the designated region image data set is not associated with the captured image data set, the control section 109 causes the captured image data set to serve as the output target image data set. Note that in the case where the control section 109 causes the designated region image data set to serve as the output target image data set, the control section 109 attaches a designated region flag to the output target image data set and causes transmission of the output target image data set attached with the designated region flag.

(3) Processes Carried Out by Captured Image Determination Section

The following description discusses how the captured image determination section 102 of the portable terminal apparatus 100 carries out the determination processes.

(3-1) Determination of Skew

As described earlier, the user selects the text image capture mode in a case where the user carries out image capture with respect to the image capture object having a rectangular shape, such as paper, a poster, or a display screen, and desires to obtain a high resolution image. Therefore, the captured image determination section 102 assumes that the image capture object has a rectangular shape, and detects, in the sub-captured image data, a skew of the image capture object by detecting an edge of the image capture object. Note that a conventionally known method can be employed as a method for detecting, in the sub-captured image data, a pixel located on the edge of the image capture object which has a rectangular shape. In order to prevent a background edge from being erroneously determined to be the edge of the image capture object, it is alternatively possible to employ a method in which it is determined that an edge of the image capture object is detected only in a case where an edge having a length of not less than a given length is detected. In this case, the given length can be set, for example, to a length which is approximately 80% of a length of an end side of an image in the sub-captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A.

Figure 3:
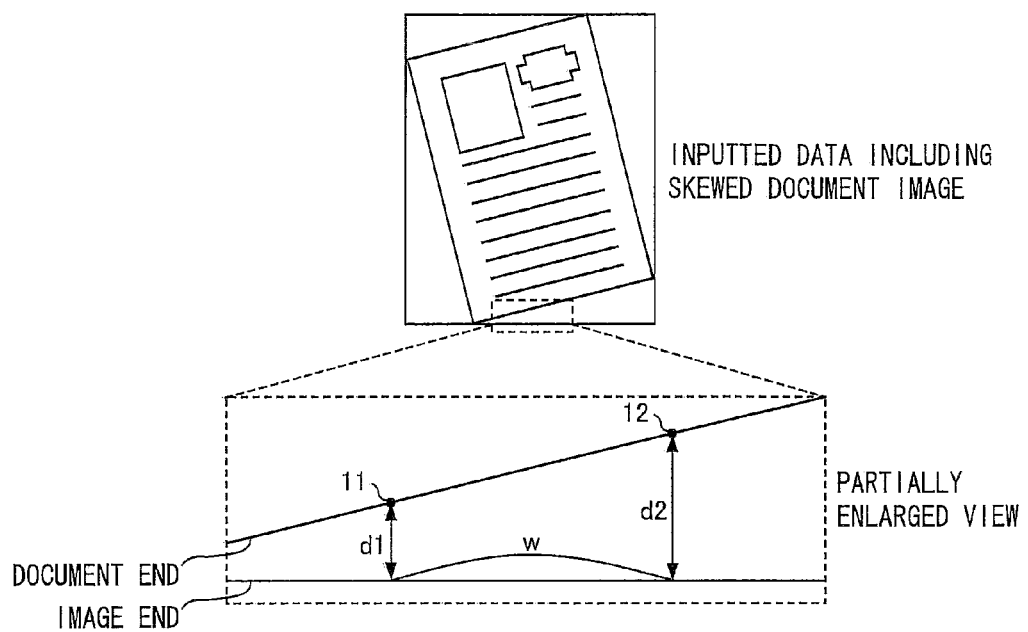
FIG. 3 is a view illustrating an example of detection of a skew of an image.

The captured image determination section 102 selects two points located on the detected edge of the image capture object. For example, the captured image determination section 102 selects two points 11 and 12 which are away from a center of the sub-captured image data by w/2 in a transverse direction to the right and left, respectively (see FIG. 3). Next, it is possible to determine a skew of the image capture object in the captured image by determining shortest distances $d_1$ and $d_2$ between an end side of the sub-captured image data and the respective selected two points 11 and 12. In the case of FIG. 3, when an angle of the skew is indicated as θ, tan θ=$(d_2-d_1)$/w. Then, the captured image determination section 102 calculates a value of $(d_2-d_1)$/w and reads out a corresponding angle θ, for example, from a table (refer to FIG. 4) which is prepared in advance.

Subsequently, the captured image determination section 102 determines whether or not the detected angle θ falls within a given range (e.g., −30° to +30)° and supplies a determined result to the control section 109. Note here that it is one of the process execution requirements that the angle θ falls within the given range.

As described above, a plurality of pieces of sub-captured image data is obtained by carrying out capturing of an image a plurality of times by the image capture section 101 upon a single shutter click. However, the plurality of pieces of sub-captured image data are only offset by an amount of a camera shake. Hence, the captured image determination section 102 just requires determining the skew of one sub-captured image data arbitrary selected from the plurality of pieces of sub-captured image data (e.g., sub-captured image data obtained first in the image capture).

(3-2) Determination of Geometric Distortion

As described earlier, the geometric distortion means that in a case where image capture is obliquely carried out with respect to the image capture object from a direction different from the normal direction of the plane of the image capture object on which plane the text image is formed, the image capture object has, in the captured image, a distorted shape instead of the rectangular shape. For example, in a case where image capture is carried out with respect to the image capture object obliquely, i.e., from a lower left direction with respect to a normal direction of the paper, the image capture object has a distorted quadrangular shape (see FIG. 5).

As described later, according to the present embodiment, the image output apparatus 200 has a function of correcting such a geometric distortion. Note, however, that in a case where the geometric distortion occurs to a large degree, readability will not be so enhanced even if the geometric distortion is corrected. In view of this, the captured image determination section 102 of the present embodiment detects features indicative of a degree of the geometric distortion so as to determine whether or not the features fall within a given range.

A boundary between the rectangular-shaped image capture object and its background is constituted by parts, each having a large fluctuation in density, being connected to each other in the form of a line segment. That is to say, the boundary in the captured image between the rectangular-shaped image capture object and its background is shown by a group of edge pixels connected to each other in the form of a line segment. Accordingly, a location of the boundary between the image capture object and the background is estimated by detecting, in the captured image data, the group of edge pixels connected to each other in the form of a line segment. That is to say, the captured image determination section 102 detects a group of edge pixels connected to each other in the form of a line segment in the captured image data (carries out straight-line recognition), and recognizes the detected group of edge pixels as the boundary between the image capture object and its background.

With the present embodiment, edges of respective sides of the image capture object do not necessarily exist in the vicinity of a center of the angle of view. In view of this, according to the present embodiment, edges are extracted, at given regular intervals, from all sides, line segments identified by the respective edges are obtained, and intersections of these line segments are calculated, thereby defining a region where the image capture object is located.

As described above, the plurality of pieces of sub-captured image data is obtained by carrying out image capture a plurality of times by the image capture section 101 upon the single shutter click. However, the plurality of pieces of sub-captured image data are only offset by an amount of a camera shake. Hence, the captured image determination section 102 just requires to carry out determination of geometric distortion as described below, to just one sub-captured image data arbitrarily selected from the plurality of pieces of sub-captured image data.

First, the captured image determination section 102 carries out a raster scanning with respect to the sub-captured image data. Note here that (i) a forward direction and (ii) a direction which is perpendicular to the forward direction are an X direction and a Y direction, respectively (see FIG. 5). Note also that an upper left corner is an origin in the captured image.

In a case where no edge is detected as a result of the scanning carried out with respect to one (1) line, the captured image determination section 102 carries out the scanning with respect to a subsequent line which is away from the one line by a predetermined distance in the Y direction. Note that an interval between the lines is not limited to a specific one, provided that it is a fixed one. Further, the line is not necessarily constituted by a single pixel.

Figure 6:
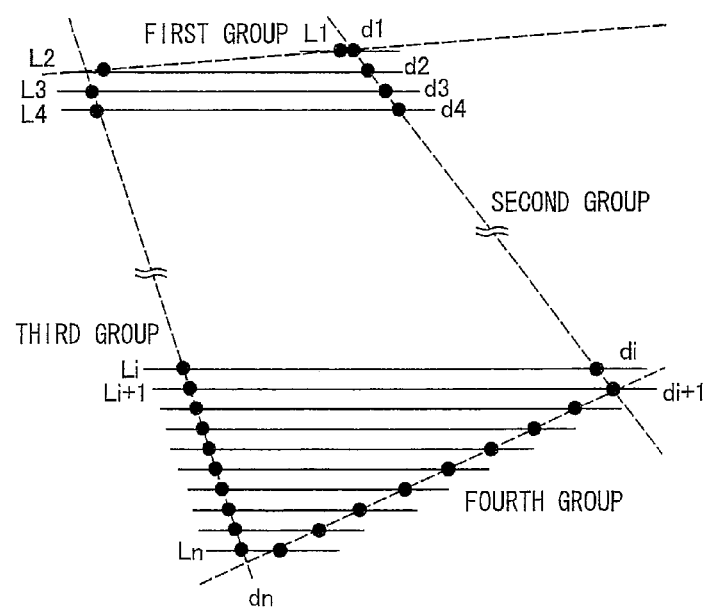
FIG. 6 is a view illustrating an example of an edge detection process carried out with respect to an image capture object in an image.

Next, in the raster scanning, the captured image determination section 102 regards, as $L_1$ (a first line), a line on which an edge is firstly detected. The captured image determination section 102 classifies, into a first group, coordinates of a point determined to be the first edge in the forward direction, and then classifies, into a second group, coordinates of a point determined to be the second edge on the first line (see FIG. 6). The scanning is consecutively carried out with respect to a subsequent line so that an edge is detected. Then, with respect to each line $L_i$, a difference in X-coordinate value between (a) a point firstly determined to be an edge of the image capture object in the forward direction and (b) a point secondly determined to be an edge of the image capture object in the forward direction (a distance $d_i$ between X-coordinates of the two points) is calculated, and then an edge determination is carried out as below.

It is assumed that the X-coordinate of the first edge on the line $L_i$ is $X_{i1}$ (the X-coordinate belonging to the first group) and the X-coordinate of the second edge on the line $L_i$ is $X_{i2}$ (the X-coordinate belonging to the second group). The features detection method is carried out as below.

(a) Coordinates $X_{11}$ and $X_{12}$ on the first line ($L_1$) are invariable.

(b) As for an ith line (i is an integer of not less than 2), an intercoordinate distance $d_{i1}$ ($=X_{i1}-X_{(i-1)1}$) and $d_{i2}$ ($=X_{i2}-X_{(i-1)2}$) are calculated. Note that the following description discusses $d_{i1}$, and so omits a suffix 1. Same applies to $d_{i2}$.

(c) As for an ith line (i is an integer of not less than 3), $dd_i$=abs$\{(d_i)-d_{i-1}\}$ is calculated. In a case where $ddi \leq th_1$ ($\approx$a small value close to 0 (zero)), a coordinate $X_i$ is classified into an identical group (the first group or the second group). Otherwise (in a case where $dd_i > th_1$), the coordinate $X_1$ is classified into a different group (a third group or a fourth group).

(d) Only in a case where i=4, a process for deciding a group of $X_2$ is carried out as an initial process. The process is carried out as below.

i) $dd_3 \leq th_1$ and $dd_4 \leq th_1 \rightarrow X_2$: identical group
    ii) $dd_3 > th_1$ and $dd_4 \leq th_1 \rightarrow X_2$: different group
    iii) $dd_3 \leq th_1$ and $dd_4 > th_1 \rightarrow X_2$: identical group
    iv) $dd_3 > th_1$ and $dd_4 > th_1 \rightarrow X_2$: identical group Once a transition of $X_2$ to the different group (the third group or the fourth group) occurs, it is unnecessary to check increase and decrease in $dd_i$.

Such a process is carried out with respect to an entire image so that edge points are extracted for each of the groups. Then, coordinates of the edge points which belong to each of the groups are subjected to linearization by use of a method such as a method of least squares or the like. This allows a straight line, which is approximate to the edge points which belong to each of the groups, to be estimated. In the embodiment, the captured image determination section 102 determines that the edge pixels are aligned in the form of a line segment in a case where an average of a square sum of a distance between an approximate straight-line calculated for each group and the edge pixels included in the group is not more than a given threshold. This allows the captured image determination section 102 to continue with the following processes. As a result, the captured image determination section 102 can detect a group of edge pixels connected to each other in the form of a line segment, which group of edge pixels are presumed as a boundary between the image capture object and its background. Note that, in a case where an average of a square sum of the distance between an approximate straight-line calculated for each group and the edge pixels included in the group is larger than the given threshold, the captured image determination section 102 may determine that the edge pixels are unlikely aligned in the form of a line segment, and ask for the user to select the edges of the image capture object among the detected edges.

Figures 7, 8:
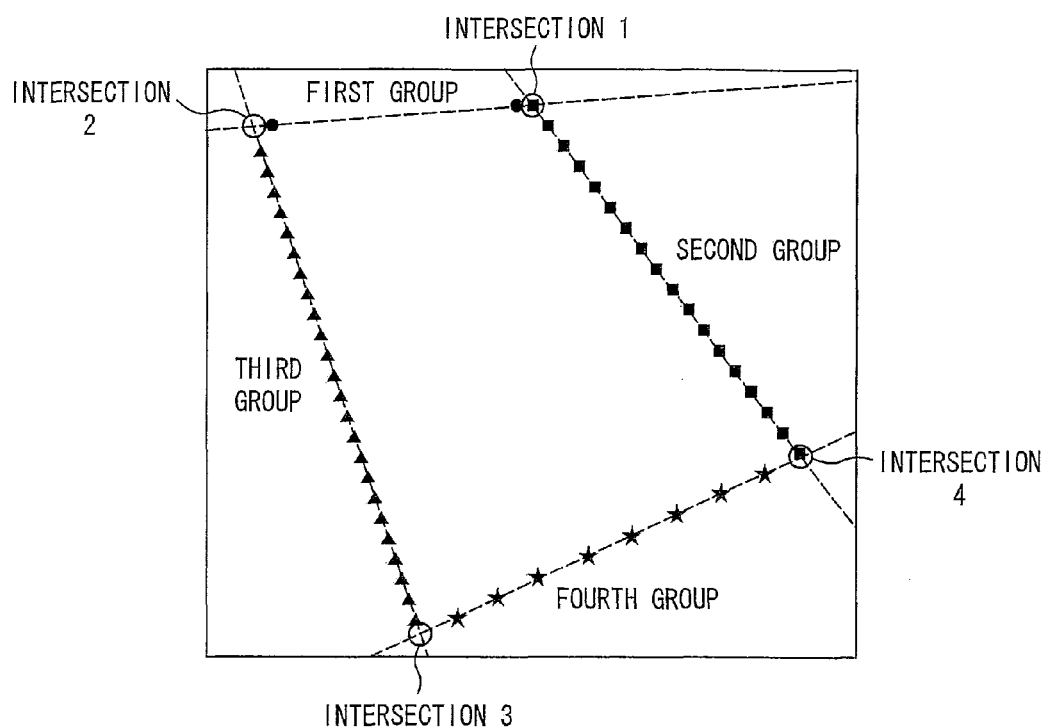
FIG. 7 is a view illustrating an example of detection of an edge of an image in a raster direction.
FIG. 8 is a view illustrating an example of a first order differential filter used in an example of detection of a degree of offset between images.

FIG. 7 is a drawing illustrating a case where edge points are extracted by the raster scanning in accordance with a process as mentioned above and classified into the four groups. Note, in FIG. 7, that a circle indicates an edge which belongs to the first group, a quadrangle indicates an edge which belongs to the second group, a triangle indicates an edge which belongs to the third group, and a star indicates an edge which belongs to the fourth group. Note also in FIG. 7 that straight lines, which have been subjected to the linearization by use of the method of least squares so as to be approximate to the edge points for each of the groups, are illustrated by respective dotted lines.

Then, intersections (intersections 1 through 4 illustrated in FIG. 7) of the straight lines for the respective four groups are found. This makes it possible to define a region surrounded by the four straight lines as a region where the image capture object is located.

Further, a classifying process as mentioned above can be carried out with respect to an image which has been subjected to a 90-degree rotation. This also allows an extraction of edges of a document which is ideally provided so as to be parallel to a horizontal direction and a vertical direction of the image. Namely, the raster scanning allows a detection of an edge in the vertical direction in the image which has not been rotated. In contrast, the raster scanning allows a detection of an edge which was in the horizontal direction before the image was rotated (which is in the vertical direction after the image is rotated) in the image which has been rotated. This also allows an extraction of edges which are parallel to the vertical direction and the horizontal direction. As long as a sufficient amount of information is obtained (for example, not less than three intersections are obtained in each of the groups) before the rotation of the image, only this information can be used. In contrast, in a case where the number of intersections obtained is less than one in any one of the groups, it is obviously impossible to formulate a straight line. In such a case, intersections obtained after the rotation of the image can be used.

Alternatively, it is also possible to formulate a straight line by (i) carrying out again a coordinate conversion with respect only to found coordinates of an intersection, (ii) obtaining a corresponding group from regions in which the respective groups are distributed, and (iii) integrating information on the intersections. Namely, the straight line can be formulated by integrating coordinates of intersections, which belong to an identical group, out of (i) coordinates of intersections which coordinates are found by the image which has not been rotated and (ii) coordinates of intersections which coordinates are obtained by carrying out a coordinate conversion with respect to intersections found by the image which has been rotated.

Note that it is possible to extract an edge point in accordance with the following method. Pixel values, obtained in a small window which has a width of at least one pixel, are compared as they are (a sum or an averages of the pixel values are compared in a case where the width is not less than two pixels). In a case where pixel values of adjacent windows have a difference of not less than a given value, an edge point can be determined. In order to prevent a background edge or an edge of a text included in the image capture object from being erroneously determined to be the edge of the image capture object, it is alternatively possible to employ a method in which it is determined that an edge of the image capture object is detected only in a case where an edge having a length of not less than a given length is detected. In this case, the given length can be set, for example, to a length which is approximately 80% of a length of an end side of an image in the sub-captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A. Alternatively, it is also possible to prevent such an erroneous detection by carrying out an evaluation of each of the coordinate groups or a process for detecting a line segment (e.g., a Hough transformation). Further, it is possible to prevent an edge of a text or a fine texture from being erroneously detected by carrying out a process employing a reduced image as preprocessing.

After finding the four straight lines and their intersections, the captured image determination section 102 calculates each ratio between lengths of opposite sides of the quadrangle defined by the four straight lines. The each ratio between the lengths can be easily calculated by use of the coordinates of the intersections. Note that the quadrangle has two pairs of the opposite sides and thus the captured image determination section 102 calculates a ratio between lengths for each of the two pairs.

Note here that the ratio between the lengths of the opposite sides is equal to 1 (one to one) in a case where image capture is carried out, from the front, with respect to the image capture object which has a rectangular shape, since the image capture object included in the captured image also has a rectangular shape. In contrast, in a case where image capture is obliquely carried out with respect to the image capture object which has a rectangular shape, the ratio becomes a value different from 1. This is because the image capture object included in the captured image has a distorted quadrangular shape. As a direction in which image capture is carried out is at a greater angle to the normal direction of the plane of the image capture object on which plane the text image is formed, a difference between a value of the ratio and 1 increases. It follows that the ratio between the lengths of the opposite sides is one of the features indicative of a degree of the geometric distortion.

Then, the captured image determination section 102 determines whether or not each of the two ratios that has been calculated falls within a given range (e.g., 0.5 to 2) and supplies a determined result to the control section 109. Note here that the given range is set in advance so that a geometric distortion correction can be made by the image output apparatus 200, and is stored in the storage section 108. Note also that it is one of the process execution requirements that each of the two ratios falls within the given range (e.g., 0.5 to 2).

Note that the captured image determination section 102 can use, as alternative features indicative of the degree of the geometric distortion, an angle formed by two selected straight lines through which any two intersections of the four intersections pass, which four intersections are the intersections detected as above.

How the features of the geometric distortion are calculated is not limited to the example in the foregoing description. For example, the captured image determination section 102 detects (carries out straight-line recognition of), among the captured image data, a group of edge pixels connected to each other in the form of a line segment, by use of a conventionally known method such as a method disclosed in Japanese Patent Application Publication, Tokukai, No. 2006-237757 A. At this time, the captured image determination section 102 may detect the group of edge pixels connected to each other in the form of a line segment, which group of connected edge pixels has a length of not less than a given length. Thereafter, the captured image determination section 102 extracts a quadrangle having (i) the detected four groups of edge pixels connected to each other in the form of a line segment serve as sides of the quadrangle and (ii) all internal angles be less than 180 degrees. Then, a ratio of the length of opposite sides of the quadrangle may be calculated as the features of the geometric distortion.

(3-3) Determination of Offset Amount of Plurality of Images

As described earlier, the image output apparatus 200 carries out the high resolution correction in accordance with the plurality of pieces of sub-captured image data of the identical image capture object. In order to carry out the high resolution correction, it is necessary that a given number of pieces of image data which varies depending on the magnification of resolution conversion be offset by a given amount. In view of this, the captured image determination section 102 of the present embodiment determines whether or not the plurality of pieces of sub-captured image data (data of the images captured by the image capture section 101) include the given number of pieces of the sub-captured image data which are required to carry out the high resolution correction and which are offset by the given amount.

Note that an offset, required for the high resolution correction which allows enhancement of text readability, intends an offset of less than one pixel (a decimal point) of target image data. Namely, an offset, which is below the decimal point (less than one pixel) such as that falls in a range of 0.3 to 0.7, is important. An offset corresponding to an integer part is not considered during the high resolution correction. For example, in the case of an offset corresponding to 1.3 pixel, 2.3 pixels, or the like each including an offset of less than one pixel, it is possible to carry out the high resolution correction in accordance with a plurality of images. In contrast, in the case of an offset of one pixel, two pixels, or the like each including no offset of less than one pixel, it is impossible to carry out the high resolution correction.

For example, in the case of a conversion magnification of ×2, the number of pieces of image data which is required for the high resolution correction is two (2). An offset amount of the decimal point of the two pieces of image data preferably falls in a range of 0.3 to 0.7, each of which is a result obtained when the offset is represented by a pixel. Therefore, information in which (i) a magnification of the resolution conversion "×2", (ii) the number of times of image capture "2", and (iii) a process execution requirement "required number of pieces of image data: 2, offset amount: 0.3 to 0.7" are associated with each other is stored beforehand in the storage section 108. In accordance with the information, the control section 109 controls (i) the image capture section 101 to carry out image capture two consecutive times and (ii) the captured image determination section 102 to carry out a determination in accordance with the process execution requirement "required number of pieces of image data: 2, offset amount: 0.3 to 0.7".

In the case of a conversion magnification of ×4, the number of pieces of image data which is required for the high resolution correction is 4. In a case where one of the four pieces of data is assumed to be reference image data, amounts of offset of the decimal point of the other three pieces of image data with respect to the reference image data preferably fall in ranges of 0.2 to 0.3, 0.4 to 0.6, and 0.7 to 0.8, respectively, each of which is a result obtained when the offset is represented by a pixel. Therefore, information in which (i) a magnification of the resolution conversion "×4", (ii) the number of times of image capture "4", and (iii) a process execution requirement "required number of pieces of image data: 4, offset amount: 0.2 to 0.3, 0.4 to 0.6, and 0.7 to 0.8" are associated with each other is stored beforehand in the storage section 108.

Note that the following description discusses, for simplicity, a case in which the magnification of the resolution conversion "×2" is selected.

First, the captured image determination section 102 selects any one of the sub-captured images data. As for the selected sub-captured image data (hereinafter referred to as a first captured image), the captured image determination section 102 selects an offset detecting partial region from the region which is defined during the determination of the geometric distortion and in which the image capture object is located. Note here that the offset detecting partial region is used so that offset amounts of the remaining sub-captured image data (hereinafter referred to as a second captured image) with respect to the first captured image are obtained. Therefore, it is preferable to select the offset detecting partial region in which there occurs a great change in pixel value (there exists a clear pattern). As such, the captured image determination section 102 extracts the offset detecting partial region in accordance with the following method.

The captured image determination section 102 specifies a pixel, serving as a target pixel, existing in a centroid of the region where the image capture object is located. Subsequently, the captured image determination section 102 selects a region where n×n pixels including the target pixel are provided. The captured image determination section 102 judges whether or not the selected region satisfies the following selection requirement. In a case where the selected region satisfies the selection requirement, the region becomes the offset detecting partial region. In contrast, in a case where the selected region does not satisfy the selection requirement, the captured image determination section 102 selects another region in accordance with a given offset and carries out an identical determination with respect to the another region. This is how the offset detecting partial region is extracted.

Note here that examples of the selection requirement include the following two requirements.

According to the first example of the selection requirement, a value which is based on a variance obtained in the region is used. A variance (x) obtained in the offset detecting partial region is expressed as the following expression (1), where P(i) is a pixel value of a region, in the vicinity of the target pixel, in which region n×n pixels are provided. The selection requirement is met when the variance (x) is not less than a given threshold. For simplicity, only a numerator of the expression (1) can be considered.

[Math. 1]

$$\text{Varience}(x) = \frac{n \times \sum_{i=0}^{n-1}[P(i)]^2 - \left[\sum_{i=0}^{n-1}P(i)\right]^2}{n \times n}$$ expression (1)

According to the second example of the selection requirement, binarization is carried out, by an edge extraction filter such as a first order differential filter, with respect to the region, in the vicinity of the target pixel, in which region n×n pixels are provided, and a sum total of binarized values is used. FIG. 8 shows an example of the first order differential filter. Similar to the first example of the selection requirement, the second selection requirement is met when the sum total is not less than a given threshold (e.g., not less than 5% of the number of pixels in the offset detecting partial region).

Next, in contrast to an offset detecting partial image A (n×n) of the first captured image, an offset detecting partial image B (m×m) (m>n) is cut out from the second captured image, the offset detecting partial image B having a center substantially identical to that of the offset detecting partial image A. The offset detecting partial image B is cut out so that coordinates of a central pixel of the offset detecting partial image A in the first captured image coincide with coordinates of a central pixel of the offset detecting partial image B in the second captured image.

Then, a region of the clipped offset detecting partial image B which region best matches the offset detecting partial image A is determined with sub-pixel-level accuracy. This can be realized by employing a normalized correlation pattern matching in which the offset detecting partial image A serves as a template.

As an example of the normalized correlation pattern matching, a correlation is obtained by use of a well-known normalized correlation equation. A correlation equation of two patterns of Input (I) and Target (T) which include N pixels can be generally expressed as the following expression (2). Note here that α, β, and γ can be expressed as below.

[Math. 2]

$$S = \{\alpha / \sqrt{\beta \times \gamma}\}$$ expression (2)

[Math. 3]

$$\alpha = N \sum (I \times T) - \left(\sum I\right) \times \left(\sum T\right)$$
$$\beta = N \sum (I \times I) - \left(\sum I\right) \times \left(\sum I\right)$$
$$\gamma = N \sum (T \times T) - \left(\sum T\right) \times \left(\sum T\right)$$

A correlation value map of 3×3 is obtained, in a case where, for example under the requirement of n=5 and m=7, the above correlation equation is calculated for each region (n×n) of the offset detecting partial image B (m×m), which each region has an identical size to the offset detecting partial image A. A fitting quadric surface is calculated by use of the correlation value map. The quadric surface is calculated based on an equation S (x, y)=axxxx+bxxxy+cxyxy+dxx+exy+f. Specifically, six points each of which has a higher correlation value are selected from nine points, and simultaneous equations are solved so that each coefficient is obtained. It is determined that the process execution requirement "required number of pieces of image data: 2, offset amount: 0.3 to 0.7" is met, in a case where values below the decimal point of coordinate values (both x and y) of an extreme value (=a maximum value) of the function S (x, y) fall within the given range (here, 0.3 to 0.7).

Note that an extreme value can be obtained by (i) carrying out partial differentiation with respect to the quadratic equation S (x, y), and then (ii) calculating coordinates of a point where a corresponding partial differential coefficient is 0 (zero). In this case, it is more efficient to directly use correlation values (S1 to S6) because it is actually unnecessary to obtain each of the coefficients (a to f). Expressions (3) to be solved are as follows. Note here that an origin serves as a target window standard.

[Math. 4]

$$x = \frac{2 \times S_3 \times S_4 - S_5 \times S_2}{S_2^2 - 4 \times S_1 \times S_3}$$

$$y = \frac{2 \times S_1 \times S_5 - S_2 \times S_4}{S_2^2 - 4 \times S_1 \times S_3}$$

expression (3)

Note that such determination of positional offset by use of the sub-pixel-level accuracy is carried out in at least one region, desirably in several regions.

Then, the captured image determination section 102 supplies to the control section 109 a determined result as to whether or not the process execution requirements are met.

(4) Notification to User

In response to the determined result received from the captured image determination section 102, the control section 109 controls the display section 105 to display a message urging image capture to be carried out again.

For example, when receiving, from the captured image determination section 102, a determined result that an angle of the skew θ falls outside the given range, the control section 109 controls the display section 105 to display a message which urges image capture to be carried out again so that the image capture object is not skewed.

In response to a determined result that features indicative of a degree of the geometric distortion (here, a ratio between the lengths of the opposite sides of the image capture object in the captured image) falls outside the given range, the control section 109 controls the display section 105 to display a message which urges image capture to be carried out again from the normal direction of the plane of the image capture object on which plane the text image is formed.

Further, in response to a determined result that the number of sub-captured image data which are offset by a given amount falls below a given number, the control section 109 controls the display section 105 to display a message, urging image capture to be carried out again, such as "This image may not be well processed. Please carry out image capture again." so that a new image is obtained. Then, the captured image determination section 102 carries out the determination processes with respect to a combination of newly captured plurality of pieces of sub-captured image data, or alternatively, a combination of the images previously captured and images recaptured.

When the captured image determination section 102 determines that all of the process execution requirements are met, the control section 109 causes the storage section 108 to store the given number of pieces of the sub-captured image data that meet the process execution requirements, as the captured image data set.

(5) Preparation of Geometric Correction Information

As described in (3-2), the captured image determination section 102 detects four edge pixel groups in the captured image indicated by the sub-captured image data, which edge pixel groups are groups of edge pixels that are connected to each other in the form of a line segment. Then, a ratio of opposite sides of a quadrangle which has the four edge pixel groups serve as its sides is calculated as features indicative of a degree of geometric distortion. The correction information preparation section 110 prepares, as geometric correction information, information indicative of locations of the four edge pixel groups each in the form of a line segment, which edge pixel groups are extracted by the captured image determination section 102.

As the geometric correction information indicative of the locations of the edge pixel groups each in the form of a line segment, information indicative of a location of an approximate straight-line obtained by linearization of the edge pixel groups may be used. In this case, the geometric correction information may have a defined point (e.g., central point or upper left corner) in the captured image indicated by the captured image data serve as an origin, and use a x coordinate and y coordinate as functions, each of which are indicative of an approximate straight line of edge pixel groups on a x-y plane, where y axis denotes a vertical direction and x axis denotes a direction perpendicular to the y axis.

The correction information preparation section 110 prepares geometric correction information for each of the four edge pixel groups detected by the captured image determination section 102, and causes the storage section 108 to store the prepared geometric correction information in such a manner that the geometric correction information is associated with a respective captured image data set.

Note that each of the plurality of pieces of sub-captured image data included in the captured image data set are offset just by a degree of a camera shake. Hence, the geometric correction information is sufficiently prepared with respect to sub-captured image data obtained by an image capture carried out first.

(6) Processes carried out by Designation Information Accepting Section

The following description deals with processes carried out by the designation information accepting section 111.

The designation information accepting section 111 reads out the captured image data set which is stored in the storage section 108 and which is assigned with the unoutputted flag, and causes a captured image to be displayed on the display section 105, which captured image is indicated by the sub-captured image data that had been image captured first, in the captured image data set.

In a case where a plurality of captured image data sets that are assigned with an unoutputted flag are stored in the storage section 108, the plurality of captured images are successively displayed in chronological order in which image capture was carried out. Alternatively, a list of thumbnail images indicated by the plurality of captured image data sets may be displayed on the display section 105.

Thereafter, the designation information accepting section 111 accepts, per captured image data set, an instruction of whether to output the entire image, or to output just the output target region which is one part of the image. With respect to the captured image data set for which the instruction to output just the output target region being one part of the image is accepted, the designation information accepting section 111 accepts designation information for determining the output target region, which designation information is indicative of a quadrangle-shaped designated region designated by the user. In the present embodiment, the designation information accepting section 111 accepts entry of the quadrangle-shaped designated region. As described above, since the plurality of pieces of sub-captured image data is offset just by a degree of a camera shake, the designation information accepting section 111 just requires to accept the designation information indicative of a quadrangle-shaped designated region designated by a user, with respect to one sub-captured image data arbitrarily selected from the plurality of sub-captured image data (e.g., the sub-captured image data obtained by the image capture carried out the first time).

In detail, the designation information accepting section 111 causes the display section 105 to display, together with the captured image, a notification to urge the user to enter locations of angular points of a quadrangle-shaped designated region. The designation information accepting section 111 then accepts coordinates of four designated points as the designation information indicative of the four angular points of the quadrangle-shaped designated region. The designated points are accepted by being pressed on the display section 105 which is a touch panel, by a finger of the user or by use of a pen attached to the portable terminal apparatus 100.

Upon designating the coordinates of the four designated points, the display may be set so that when the screen is pressed, the pressed part is displayed in an enlarged manner. The pressed part may be displayed on the entire screen, or the pressed part may be enlarged to a size ¼ of the screen and displayed while the entire image is still displayed so that the pressed part is displayed overlapping the display of the entire image. At this time, an adjusting button may be displayed to allow fine adjustments to the designated position. Thereafter, for example, the location is fixed by pressing an "OK" button, and the screen returns to displaying the entire image. By allowing such fine adjustments, it is possible to save effort for making corrections or the like later on.

Figure 9:
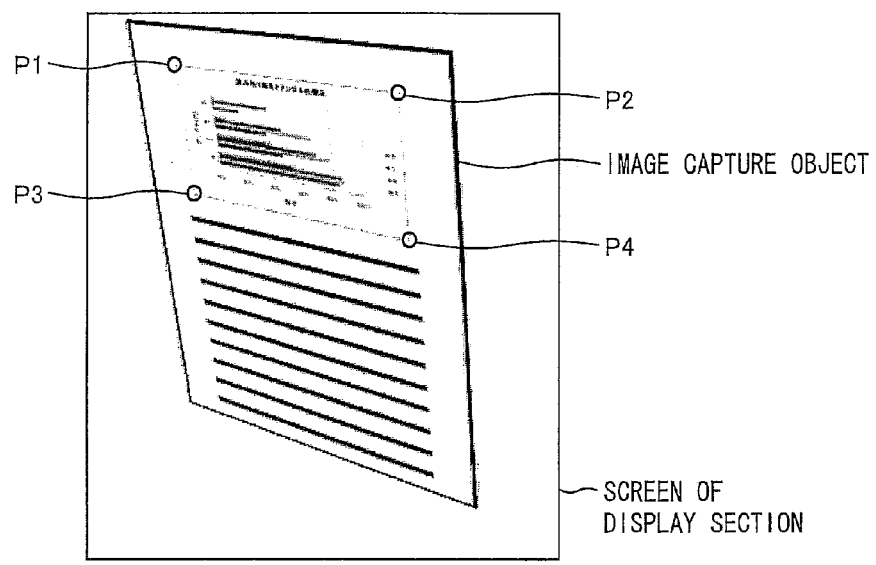
FIG. 9 is a view illustrating an example of a screen displayed on a display section at a time when four designated points for designating an output target region are entered.

FIG. 9 is a view illustrating an example of a screen of the display section 105 upon entering the four designated points for determining the output target region. As illustrated in FIG. 9, the designation information accepting section 111 causes the entire captured image indicated by the captured image data to be displayed on the display section 105. Note that, FIG. 9 is an example in which the entire captured image is displayed by using the entire surface of the display section 105. In FIG. 9, points P1 to P4 indicate the four designated points that are designated by the user. Further, the designation information accepting section 111 accepts coordinates of the four designated points P1 to P4 as the designation information.

There are cases here where the point pressed by the user is a region having a size to some degree. Hence, the designation information accepting section 111 may accept a central point of a pressed region as the designated point. Alternatively, the designation information accepting section 111 may calculate a centroid of a quadrangle which has the four pressed central points serve as its angular points; and for each of the four pressed regions, the designated point may be a point that is included in the respective region and is most far from the centroid. Alternatively, the designated point may be four points that meet the following conditions: (a) the four points are extracted from the four pressed regions, respectively; and (b) a quadrangle formed by having the four extracted points serve as its angular points have a largest area possible.

As described above, a captured image geometrically is distorted by carrying out image capture obliquely. Therefore, the user may wish to select, as the output target region, not a rectangular shape, but a region having a distorted quadrangle shape. Accordingly, the designation information accepting section 111 can accept a quadrangle region as the designated region, not limited to just the rectangular shape.

(7) Processes Carried Out by Region Determination Section

The following description specifically explains processes carried out by the region determination section 112. As described above, the region determination section 112 determines the output target region based on the designation information accepted by the designation information accepting section 111. The following methods can be considered as methods to determine the output target region.

(Method A) The most simple method is to have the region determination section 112 determine, as the output target region, a quadrangle-shaped region which has the four designated points of locations indicated by the designation information serve as angular points of the quadrangle-shaped region. Namely, the region determination section 112 determines the designated region as the output target region, as it is.

(Method B) Moreover, the region determination section 112 may determine a region slightly larger than the region indicated by the designation information, as the output target region. The portable terminal apparatus 100 is often designed to have a generally compact shape, in view that the portable terminal apparatus 100 is carried around. Therefore, the display section 105 of the portable terminal apparatus 100 is also often small. This may cause designation of a designated region that is smaller than the desired region, by mistake.

Figure 10:
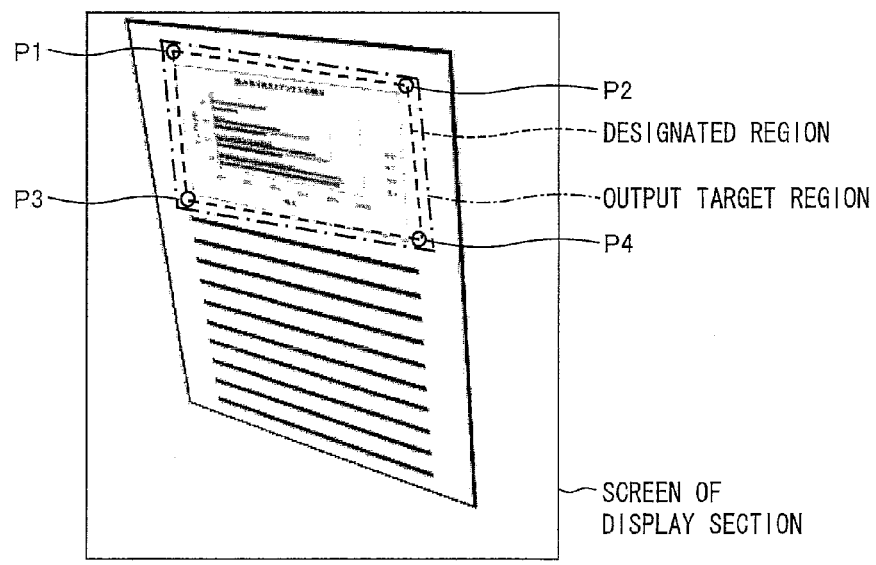
FIG. 10 is a view illustrating another example of a screen displayed on a display section at a time when four designated points for designating an output target region are entered.

Accordingly, as illustrated in FIG. 10, the region determination section 112 may determine for example a region 10% larger than the quadrangle-shaped designated region having the entered designated points P1 to P4 serve as the angular points. More specifically, the region determination section 112 calculates a centroid of a quadrangle which has the entered four designated points serve as the angular points, and calculates half-lines in which this centroid serves as its end point and which includes the centroid and a respective designated point. Thereafter, the region determination section 112 determines, for each of the half-lines, points that are apart from the centroid by 1.1 fold distance of the distance between the centroid to the respective entered designation point, as respective angular points of the output target region. As a result, it is possible to prevent output of the image by lacking one part of a user-desired region.

(Method C) In a case where a user designates a region for determining the output target region in the captured image, cases are presumed in which a region surrounded by closing lines such as a graph or table in the image capture object as illustrated in FIG. 9 is selected as the designated region. Alternatively, a case is presumable in which the entire image capture object is selected. In such cases, it is preferable that a region surrounded by a closing line or a boundary between the image capture object and a background image is determined as the output target region.

However, in regards that the portable terminal apparatus 100 is to be carried around, the portable terminal apparatus 100 is designed relatively small, and a screen of the display section 105 is also often small. Therefore, even if a region surrounded by such a closing line or boundary is attempted to be selected as the output target region, it is difficult to accurately designate a pixel existing on the line. As a result, it is considered that a region offset from a desired output target region is inevitably designated as the designated region. The present method allows determining the desired output target region from the designated region, even in such cases.

As described above, pixels that constitute such a closed line or boundary are characteristic in that its pixel concentration differs relatively greatly from their surrounding pixels. Hence, it is possible to detect these pixels as edge pixels. The present processing example makes use of detecting the edge pixels. Note that a well known technique is sufficiently usable as the method of detecting the edge pixels.

Figure 5:
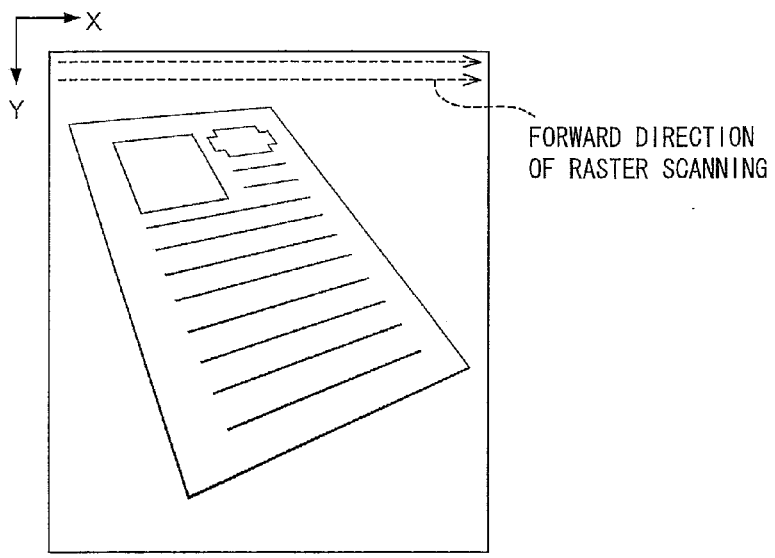
FIG. 5 is a view illustrating an example of detection of a geometric distortion of an image.

Moreover, in the present method, the designation information is coordinates of four designated points entered as four angular points of a designated region. As illustrated in FIG. 5, these coordinates have the upper left corner of the captured image as its origin, and are represented by a coordinate of an X-axis in a horizontal direction and a coordinate of a Y-axis perpendicular to the X-axis.

The region determination section 112 classifies the designated points indicated by the four coordinates in the designation information into: an upper left designated point P1, an upper right designated point P2, a lower left designated point P3, and a lower right designated point P4, as illustrated in FIG. 9. In detail, the region determination section 112 groups the four designated points into two designated points that have a smaller X-coordinate value, and two designated points that have a larger X-coordinate value. Next, the region extraction section 113 sets a designated point having a smaller Y-coordinate of the two designated points having the smaller X-coordinate value as the upper left designated point P1, and the other designated point having a larger Y-coordinate value of the two designated points having the smaller X-coordinate value as the lower left designated point P3. Further, the region determination section 112 sets a designated point having a smaller Y-coordinate value of the two designated points having the larger X-coordinate value as an upper right designated point P2, and sets the other designated point having a larger Y-coordinate value of the two designated points having the larger X-coordinate value as a lower right designated point P4.

Subsequently, the region determination section 112 defines, in the sub-captured image data included in the captured image data set, blocks of several ten pixels (e.g., 20 to 30 pixels)×several ten pixels (e.g., 20 to 30 pixels), which blocks have respective designated points serve as their centers. Thereafter, the region determination section 112 detects the edge pixels in each of the blocks. Then, the region extraction section 113 connects adjacent edge pixels in each of the blocks, and determines a shape of the connected plurality of edge pixels, by referring to referential shapes.

Figures 20, 21:
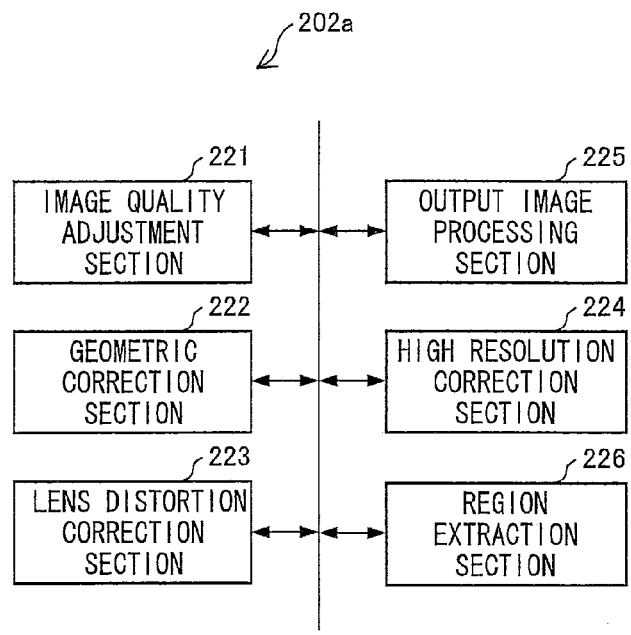
FIG. 20 is a block diagram illustrating an arrangement of a modification of an image processing section provided in an image output apparatus.
FIG. 21 is a view illustrating referential shapes.

Here, the referential shapes are provided beforehand in accordance with the designated points P1 to P4, as illustrated in FIG. 21. In detail, the referential shape with respect to the designated point P1 is an edge shape around an upper left corner section of a rectangular closed line, the referential shape with respect to the designated point P2 is an edge shape around an upper right corner section of a rectangular closed line, the referential shape with respect to the designated point P3 is an edge shape around a lower left corner section of a rectangular closed line, and the referential shape with respect to the designated point P4 is an edge shape around a lower right corner section of a rectangular closed line.

For example, in a case where the designated point P1 is determined as an edge shape of the upper left corner section based on a coordinate location of an end point upon connecting the edge pixels (two end points and connecting section), the region determination section 112 carries out a defined point selection process for selecting, as a defined point, not the designated point of the coordinate indicated by the designation information but a point of a pixel that constitutes the corner section, among the extracted edge pixels. In a case where the designated point P1 is determined as not the edge shape of the upper left corner section, the region determination section 112 employs the designated point of the coordinate indicated by the designation information. The edge shape is determined from the captured image data in the image-captured state, in which no geometric correction has been carried out as illustrated in FIG. 9. Hence, an angle of the edge section can possibly be an acute angle or an obtuse angle. Accordingly, the edge shape is sufficiently determined based on whether a corner is formed and a direction of a straight-line pattern. Moreover, the corner section does not necessarily require two line patterns be connected together; determination of the edge shape may be carried out even if a few pixels are lacking; these lacking few pixels are determined as originally connected together. An appropriate value of an allowable pixel number is set based on various image samples. Note that the region determination section 112 may carry out the defined point selection process per designated point. Alternatively, in a case where all the designated points are determined as edge shapes that correspond to respective designated points, the region determination section 112 may select, as the defined points, points of the four pixels that constitute respective corner sections, among the edge pixels extracted from respective blocks, instead of the four designated points.

Further, the region determination section 112 determines, as the output target region, a quadrangle-shaped region having the four defined points as its angular points, which defined points are selected based on the designated points.

This makes it possible to select pixels constituting respective corner sections of a closed line or a boundary as angular points of an output target region, even if a point slightly offset of the corner section of the closed line or the boundary is designated on the display section 105 of the portable terminal apparatus 100, while the region surrounded by the closed line or the boundary is desirably selected. As a result, the user can obtain their desired output target region by designating a point fairly close to the respective designated point, even if the designated point is not accurately entered.

(8) Transfer of Output Target Image Data to Image Output Apparatus

The user is to come close to the image output apparatus 200 carrying the portable terminal apparatus 100 with themselves, so as to operate the portable terminal apparatus 100 to send the output target image data to the image output apparatus 200 by use of a short-distance wireless communication such as infrared communication. In detail, the user enters into an input section 106 of the portable terminal apparatus 100 an instruction to transmit the output target image data to the image output apparatus 200.

After the instruction to transmit the output target image data is entered, the control section 109 defines the output target image data for each of the captured image data sets stored in the storage section 108, which captured image data sets have the unoutputted flag assigned thereto. Thereafter, the control section 109 causes the communication section 104 to carry out a transmission process to transmit the output target image data to the image output apparatus 200. Note that the communication section 104 sends, together with the output target image data, (i) a file name, (ii) output process information, (iii) geometric correction information, and (iv)

model information and user information stored in the storage section 108. Note that each of (i) to (iv) is associated with the captured image data set.

In a case where the designated region image data set associated with the captured image data set is stored in the storage section 108, the control section 109 causes the designated region image data set to serve as the output target image data, and in a case where the designated region image data set associated with the captured image data set is not stored in the storage section 108, the control section 109 causes the captured image data set to serve as the output target image data. This minimizes the capacity of transmission data to the least possible.

Further, in a case where the designated region image data set is transmitted as the output target image data, the control section 109 causes transmission of the output target image data having a designated region flag assigned thereto. This designated region flag indicates that the output target image data is not an entire captured image but includes just the designated region of the captured image.

Note that, upon entry of the instruction to transmit the output target image data, the control section 109 may cause the display section 105 to display a list of the captured image data sets stored in the storage section 108, and urge the user to enter which data is to be transmitted. Then, the control section 109 may cause transmission of the output target image data with respect to the captured image data set(s) selected by the user.

The control section 109, after the output target image data is transmitted, deletes the unoutputted flag assigned to the captured image data set corresponding to the transmitted output target image data, and assigns an outputted flag to indicate that the output target image data has been outputted.

(9) Arrangement of Image Output Apparatus

An arrangement of the image output apparatus 200 is described below. In the present embodiment, the image output apparatus 200 is a multifunction printer which has functions of a scanner, a printer, a copying machine, and the like.

Figure 11:
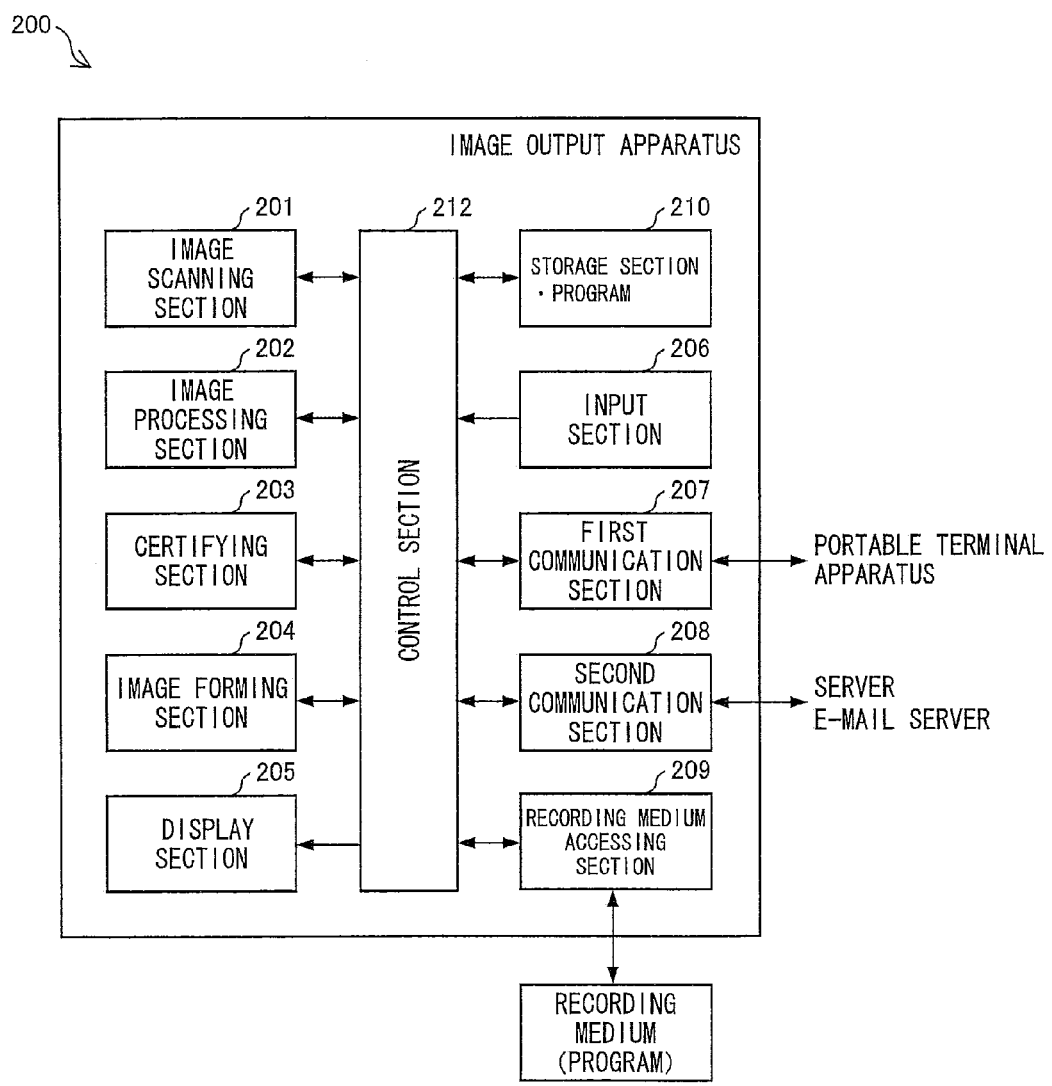
FIG. 11 is a block diagram illustrating an arrangement of the image output apparatus in accordance with one embodiment of the present invention.

FIG. 11 is a block diagram illustrating the arrangement of the image output apparatus 200. The image output apparatus 200 includes an image scanning section 201, an image processing section (a corrected-data preparation section) 202, a certifying section 203, an image forming section (output section) 204, a display section 205, an input section 206, a first communication section (receiving section) 207, a second communication section (output section) 208, a recording medium accessing section 209, a storage section 210, and a control section (output section) 212.

The image scanning section 201 scans a document and has a scanner section including a CCD (Charge Coupled Device) which converts light reflected from the document to an electric signal (an analogue image signal) which has been subjected to R, G, and B color separations. Then, the image scanning section 201 outputs this electric signal.

The image processing section 202 carries out given image processing with respect to image data. According to the present embodiment, the image processing section 202 carries out the given image processing with respect to image data to be outputted which is received from the portable terminal apparatus 100, so as to prepare corrected image data. The image processing in the image processing section 202 will be described later in detail.

The certifying section 203 carries out user certification when the output process is carried out with respect to the output target image data received from the portable terminal apparatus 100. In detail, the certifying section 203 carries out the user certification by comparing (a) the user information received from the portable terminal apparatus 100 with (b) the user information entered from the input section 206 (a user ID and a password). The certifying section 203 transmits a certified result to the control section 212.

The image forming section 204 forms an image on recording paper such as paper by use of an electrophotographic printing method, an ink-jet method, or the like. That is to say, the image forming section 204 carries out printing processing, in which an image indicated by corrected image data is printed on a recording sheet such as recording paper or OHP paper as one of an output processing.

The display section 205 is realized by a liquid crystal display device, for example. The input section 206 is provided for entering data by, for example, touching a touch panel or a button included in the liquid crystal display device.

The first communication section 207 has functions of the serial/parallel transfer and the wireless data communication which are carried out in conformity with the USB 1.1 or USB 2.0 Standard. The first communication section 207 receives, from the portable terminal apparatus 100, the output target image data to which the file name, the information on the model of the portable terminal apparatus 100, the user information, and the output process information are added.

The second communication section 208 has the following functions (a) through (c): (a) data communication employing a wireless technology which is in conformity with any one of LAN standards IEEE 802.11a, IEEE 802.11b, and IEEE 802.11g, (b) data communication with a network, via a LAN cable, having a communications interface function employing Ethernet (registered trademark), and (c) data communication employing a wireless technology which is in conformity with any one of communication systems such as IEEE 802.15.1 (so-called Bluetooth (registered trademark) which is the wireless communication standard, the infrared communication standard such as IrSimple, and Felica (registered trademark).

The second communication section 208 carries out, as an output process, (i) a filing process for storing, in a server, corrected image data which has been subjected to the given image processing by the image processing section 202, or (ii) an e-mail transmission process for transmitting an e-mail to which the corrected image data which has been subjected to the given image processing is attached.

The recording medium accessing section 209 reads out a program from a recording medium in which the program is recorded. The storage section 210 serves as a section in which a program for causing the sections of the image output apparatus 200 to carry out their respective processes is stored.

The control section 212 carries out control with respect to the sections included in the image output apparatus 200. In detail, when the first communication section 207 receives the output target image data from the portable terminal apparatus 100 (captured image data set or designated region image data set), the control section 212 supplies the output target image data to the image processing section 202 so as to control the image processing section 202 to carry out the image processing. In addition, the control section 212 supplies, to the certifying section 203, the user information added to the output target image data so as to control the certifying section 203 to carry out a certification process. When receiving a certified result that the certification has been successfully carried out, the control section 212 controls the corresponding process to be carried out in accordance with the output process information added to the output target image data. Namely, in a case where the output process information is indicative of the printing process, the control section 212 controls the image forming section 204 to carry out the printing in accordance with the corrected image data prepared by the image processing section 202. Alternatively, in a case where the output process information is indicative of the filing process or the e-mail transmission process, the control section 212 controls the second communication section 208 to carry out the filing process or the e-mail transmission process in accordance with the corrected image data prepared by the image processing section 202.

(10) Image processing carried out by Image Processing Section

The image processing carried out by the image processing section 202 is described below in detail. Note that the description below discusses details of the image processing carried out with respect to the output target image data, received from the portable terminal apparatus 100, though the image processing section 202 also carries out the image processing with respect to the image data scanned by the image scanning section 201.

Figure 12:
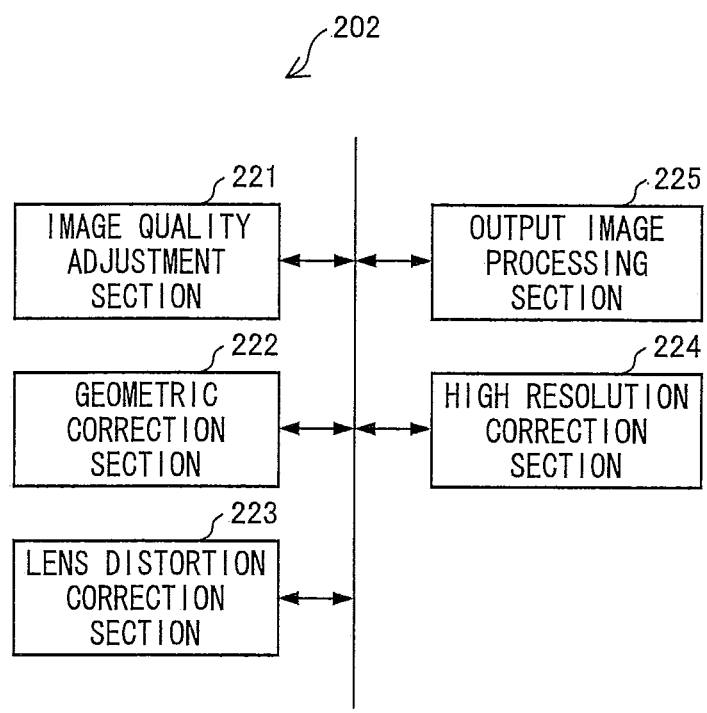
FIG. 12 is a block diagram illustrating an arrangement of an image processing section provided in an image output apparatus according to one embodiment of the present invention.

FIG. 12 is a block diagram illustrating an inner arrangement of the image processing section 202. As illustrated in FIG. 12, the image processing section 202 includes an image quality adjustment section 221, geometric correction section (mapping preparation section) 222, lens distortion correction section 223, high resolution correction section 225, and output image processing section 224. Details of processes carried out in the sections are described in order.

(10-1) Image Quality Adjustment Section

Figures 13, 14:
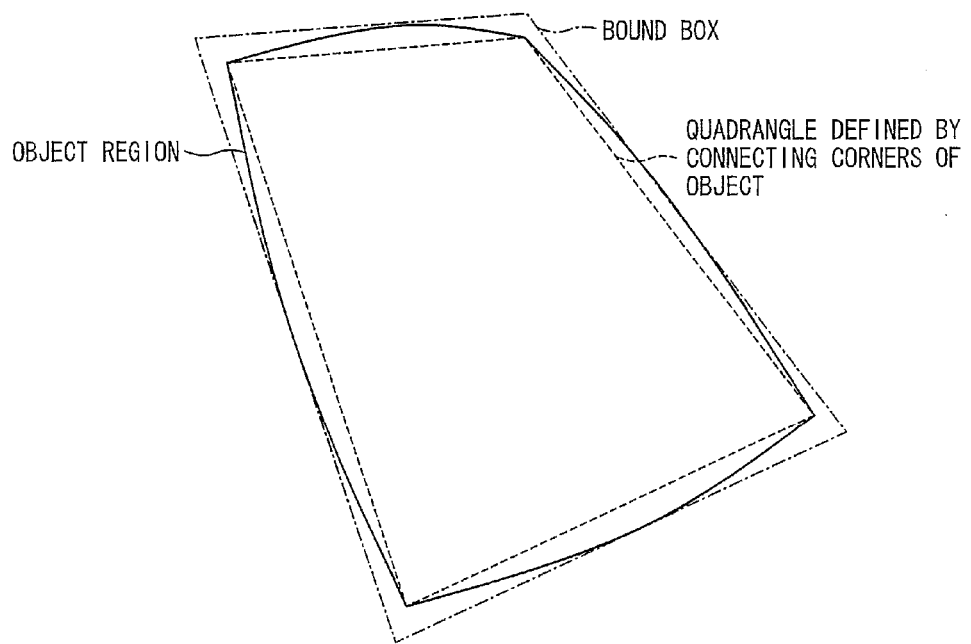
FIG. 13 illustrates an example of a look-up table prepared at a time when color balance of an image is to be adjusted.
FIG. 14 is a view illustrating an example of a correction for lens distortion of an image.

The image quality adjustment section 221 carries out correction of color balance and contrast in sub-image data (sub-captured image data or sub-designated region image data) included in an output target image data set. The image quality adjustment section 221 (i) finds maximum and minimum values of the received sub-image data for each of the color channels, (ii) prepares look-up tables which cause the color channels to have uniform maximum and minimum values, and (iii) applies the look-up tables to the respective color channels. In detail, the image quality adjustment section 221 prepares, as the look-up table, a table as illustrated in FIG. 13, in which a maximum value and a minimum value of a given channel is MX and MN, respectively, and the value is increased in increments of (MX−MN)/255 from MN when the data is of 8 bits. Thereafter, the image quality adjustment section 221 converts the pixel values in accordance with the created table. This as a result corrects the color balance.

Moreover, the image quality adjustment section 221 carries out the contrast correction in a similar manner to the color balance correction. Note that the look-up tables applied to the respective color channels can be identical in a case where it is unnecessary to change a color balance to a specific one.

Note that an alternative publicly-known technique can be applied to the color balance and contrast corrections.

(10-2) Lens Distortion Correction Section

The lens distortion correction section 223 carries out lens distortion correction in the case where the output target image data received from the portable terminal apparatus 100 is not the designated region image data set but the captured image data set. Note that whether the output target image data is the designated region image data set or the captured image data set is determined by confirming whether or not the designated region flag is attached to the output target image data.

In a case where the output target image data is the captured image data set, like the captured image determination section 102, the lens distortion correction section 223 sequentially detects, by the raster scanning, points on an edge of the image capture object in the captured image. Then, the lens distortion correction section 223 carries out a curve fitting with respect to the points detected on the edge, and carries out the lens distortion correction based on a curvilineal expression. Note that, whether or not the output target image data is the captured image data set which is the entire captured image is determined in accordance with whether or not the region designation information is attached to the output target image data. In detail, in the case where the region designation information is assigned to the output target image data, the output target image data is determined as the designated region image data set, and in the case where the region designation information is not assigned to the output target image data, the output target image data is determined as the captured image data set.

In detail, the lens distortion correction section 223 detects the edge points of the detected image capture object and classifies, like the captured image determination section 102, the edge points into four groups which correspond to four sides of the image capture object. Subsequently, as illustrated by the solid lines in FIG. 14, the lens distortion correction section 223 carries out a quadratic curve approximation with respect to the edge points which belong to each of the four groups. Four quadratic curves thus determined with respect to the respective four groups correspond to the respective four sides of the image capture object. In addition, the lens distortion correction section 223 finds four intersections of the four quadratic curves which intersections correspond to corner sections of a region defined by the four quadratic curves. Next, the lens distortion correction section 223 finds a bound box (see one-dot chain lines in FIG. 14) in which the four quadratic curves determined for the respective four sides are circumscribed, and which is similar to a quadrangle (see dotted lines in FIG. 14) defined by connecting the four intersections. Then, the lens distortion correction section 223 carries out a transformation with respect to the location of pixels in a region where the image capture object is located in the captured image so that the edge pixels of the image capture object which has been corrected are located on the sides of the bound box. Such a transformation can be carried out by carrying out calculations in accordance with vectors from a reference point (e.g., the centroid of the region where the image capture object is located). This allows the lens distortion, due to the image capture section 101 of the portable terminal apparatus 100, to be corrected.

How the lens distortion is corrected is not limited to the foregoing method, and publicly known techniques may also be used.

(10-3) Geometric Correction Section

The geometric correction section 222 corrects distortion with respect to an image capture object caused by carrying out image capture with respect to an image capture object having a rectangular shape such as a poster or document paper, from a direction different from a planar normal direction from which the text image is formed (i.e., planar distortion of a rectangular shape on which a text image is formed), and corrects a skew of the image capture object in the image data.

In detail, the geometric correction section 222 corrects geometric distortion and skew as described below, based on the geometric correction information received from the portable terminal apparatus 100.

Figure 15:
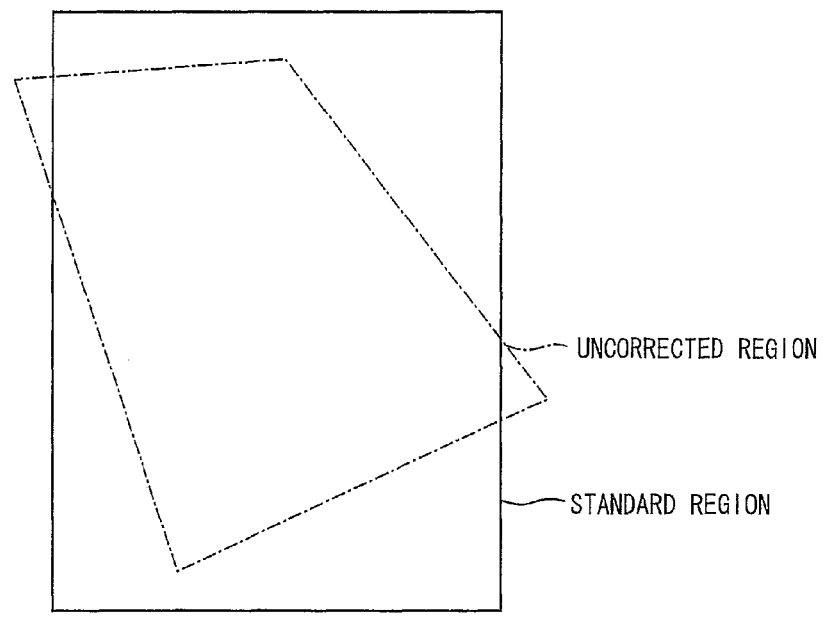
FIG. 15 is a view illustrating an example of a correction for geometric distortion and skew of an image.

First, the geometric correction section 222 defines a quadrangle-shaped region (uncorrected region) that is surrounded by straight lines (approximate straight lines of edge pixel groups each in the form of a line segment) positioned at locations indicated by the geometric correction information. Next, as illustrated in FIG. 15, the geometric correction section 222 obtains a mapping to convert the defined quadrangle-shaped uncorrected region (shown by the alternate long and short dash line in FIG. 15) to a standard region of a rectangular shape (e.g., if an A-size or B-size used in business documents, 7:10; shown by the solid line in FIG. 15) in which two upper and lower sides are substantially parallel in a horizontal direction and which has a given aspect ratio and size. Note that the upper and lower two sides of the standard region do not need to be completely parallel in the horizontal direction, and may have a slight angle within a given range (may be substantially parallel) with respect to the horizontal direction. In the embodiment, mapping denotes a rule fx and fy for carrying out mapping transformation (coordinate conversion processing) from a coordinate (x1, y1) of a pixel in the uncorrected region to a coordinate (x2, y2) of a corresponding pixel in a standard region, and is represented by: x2=fx(x1, y1); y2=fy (x1, y1). A publicly-known technique can be used as the mapping transformation. Note that the image processing section 202 can carry out the mapping transformation in accordance with an aspect ratio stored in the storage section 210 or an aspect ratio entered from the input section 206. Moreover, a size of the standard region may be set as a size entered into the input section 206, or may be set to a size identical to an area of the uncorrected region.

Next, the geometric correction section 222 carries out, in accordance with the obtained mapping, coordinate conversion with respect to the sub-image data (sub-captured image data or sub-designated region image data) included in the output target image data received from the portable terminal apparatus 100. This makes it possible to carry out correction of the geometric distortion and skew (hereinafter may be referred to as geometric correction).

Note that methods for geometric correction is not limited to the above methods and that publicly-known techniques can be employed for the correction.

(10-4) High Resolution Correction Section

The high resolution correction section 225 carries out high resolution correction to the output target image data received from the portable terminal apparatus 100. In the present embodiment, the high resolution correction section 225 carries out the high resolution correction based on the plurality of sub-image data included in the output target image data received from the portable terminal apparatus 100.

As for a method for forming a high resolution image in accordance with a plurality of pieces of image data, several methods are disclosed in the Journal of the Institute of Image Information and Television Engineers Vol. 62, No. 3, pp. 337 through 342 (published in 2008). Generally, the high resolution correction process includes a positioning process for a plurality of images and a reconstructing process. In the present embodiment, the normalized correlation pattern matching (see the description of (3-3)) is used as an example of a positioning process. Namely, it is possible to carry out the positioning for a plurality of images by displacing the plurality of images by an offset amount corresponding to an extreme value of the foregoing S (x, y).

Next, the high resolution correction section 225 carries out the reconstructing process. Namely, the high resolution correction section 225 prepares reconstructed image data whose number of pixels corresponds to a magnification obtained after the resolution conversion. Note, however, that a reconstructed image is assumed to have a size identical to that of the captured image. Then, the high resolution correction section 225 determines pixel values of respective pixels in the reconstructed image data. Namely, the high resolution correction section 225 selects, from the plurality of captured images, a plurality of pixels of the captured image (captured image pixels) located in the vicinity of each of the pixels (reconstructed pixels) in the reconstructed image data, and then carries out an interpolation with respect to the reconstructed pixel in accordance with a general interpolation method (e.g., a linear interpolation method and a bi-cubic interpolation method).

Figure 16:
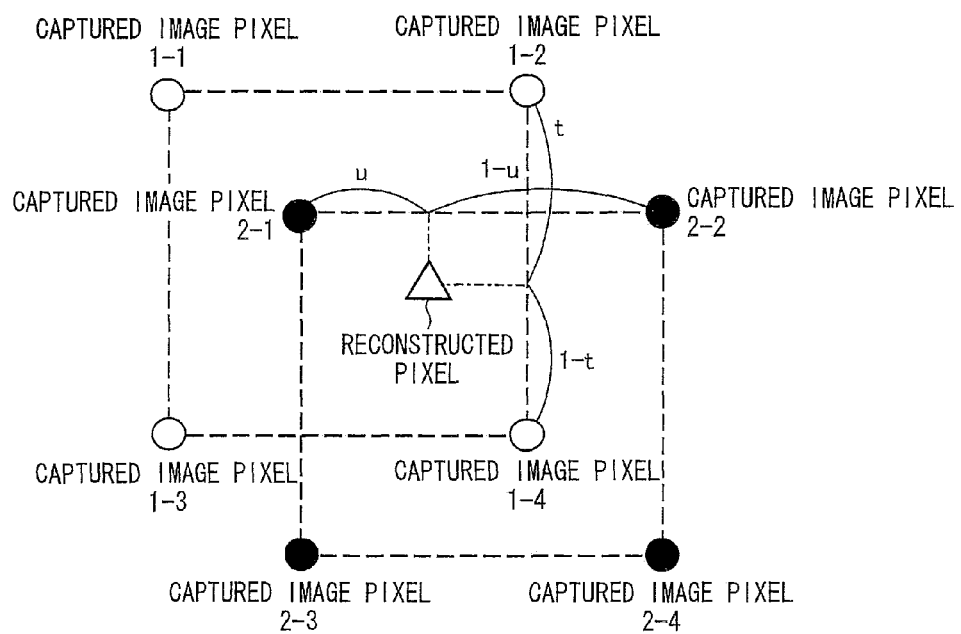
FIG. 16 is a view illustrating an example of determination of a reconstructed pixel value of an image.

In detail, as illustrated in FIG. 16, two captured image pixels located in the vicinity of a target reconstructed pixel are selected in each of transverse and longitudinal directions. For example, two captured image pixels, whose line segment (see the dotted lines in FIG. 16) is the closest to the target reconstructed pixel, are selected. Assume here that the two captured image pixels selected in the transverse direction are a captured image pixel 1-2 (pixel value: $V_{i1\text{-}2}$: pixel values of the following captured image pixels will be similarly indicated) of a first captured image and a captured image pixel 1-4 of the first captured image, whereas the two captured image pixels selected in the longitudinal direction are a captured image pixel 2-1 of a second captured image and a captured image pixel 2-2 of the second captured image. Note that it is assumed that the captured image pixels located in the vicinity of the reconstructed pixel are selected from the plurality of pieces of captured image data which have been subjected to the geometric distortion correction and the lens distortion correction. This makes it possible to carry out the high resolution correction in a state where the geometric distortion and the lens distortion have already been corrected.

Note that, a coordinate value obtained after the correction can be calculated by taking into consideration the geometric distortion correction and the lens distortion correction for the uncorrected plurality of pieces of captured image data. Namely, it is possible to (i) carry out the reconstruction process after only calculating correction values of the geometric distortion and the lens distortion, and then (ii) carry out the coordinate transformation by use of the correction values.

Subsequently, two intersections of (i) the line segments each of which is defined by the two points selected in the transverse and longitudinal directions and (ii) straight lines on each of which the target reconstructed pixel is located and each of which is perpendicular to a corresponding one of the line segments are found. In a case where the two intersections are internally dividing points of t:1−t and u:1−u on the respective two line segments (see FIG. 16), the image processing section 202 can calculate a pixel value $V_s$ of the target reconstructed pixel in accordance with the following expression (4). It follows that the linear interpolation is carried out. Then, pixel values of all the reconstructed pixels are similarly calculated, so that it is possible to prepare reconstructed image data which has been subjected to the high resolution correction as high resolution image data.

[Math. 5]

$$V_s = \{(1-t)V_{i1\text{-}2} + tV_{i1\text{-}4} + (1-u)V_{i2\text{-}1} + uV_{i2\text{-}2}\}/2 \qquad \text{expression (4)}$$

Note that an alternative interpolation method can be employed. Note also that a further method disclosed in the Journal of the Institute of Image Information and Television Engineers Vol. 62, No. 3, pp. 337 through 342 (published in 2008) can be employed. For example, it is possible to employ an interpolation method such as a MAP (Maximum A Posteriori) method in which an assessment function which corresponds to an assumptive posterior probability is first minimized so that the pixel values of all the reconstructed pixels are obtained.

(10-5) Output Image Processing Section

The output image processing section 224 carries out a segmentation process, a color correction, a black generation and under color removal, a spatial filter process, and a halftone process, at a time when the output target image data is outputted. Well known techniques are usable for carrying out these processes.

(11) Procedure of Image Processing carried out in Captured Image Processing System A flow of processes carried out in the captured image processing system in accordance with the present embodiment is described below. Note that FIG. 17 illustrates a processing flow in the portable terminal apparatus 100, and FIG. 18 illustrates a processing flow in the image output apparatus 200.

Figure 17:
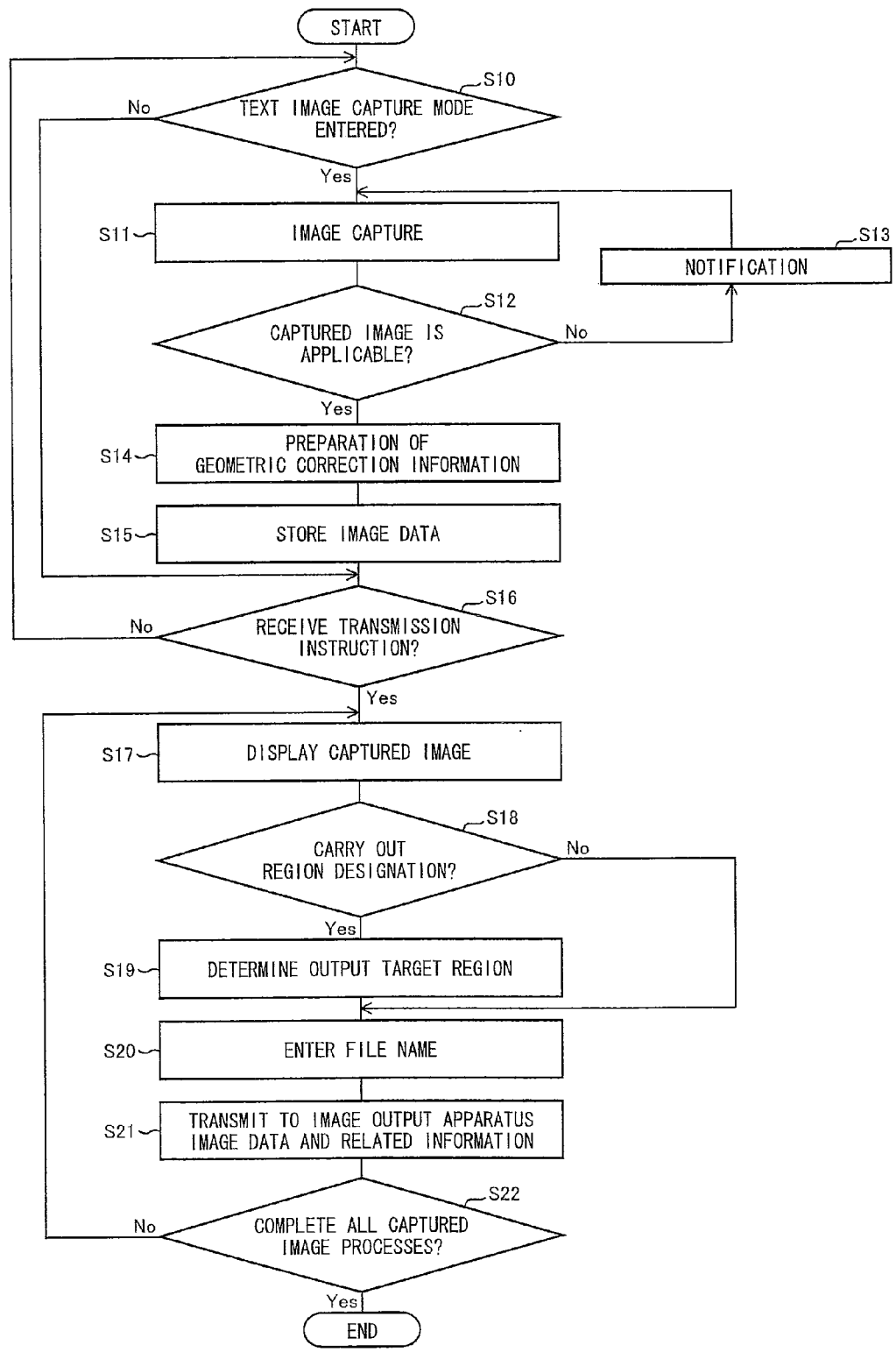
FIG. 17 is a flow chart illustrating procedures carried out in a portable terminal apparatus.
Figure 18:
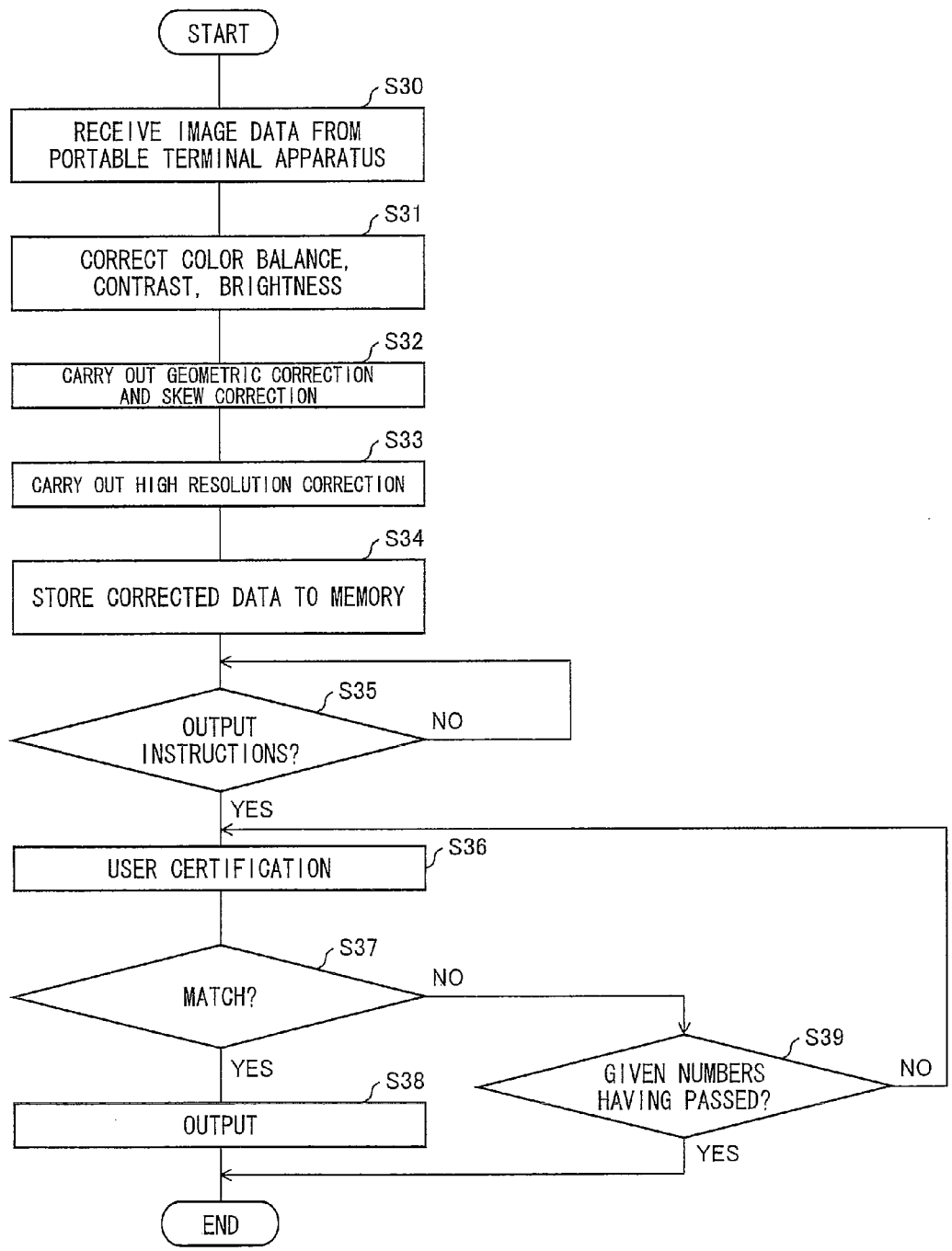
FIG. 18 is a flow chart illustrating an entire view of procedures carried out in an image output apparatus.

First described is the flow of processes carried out in the portable terminal apparatus 100, with reference to FIG. 17. The portable terminal apparatus 100 checks whether or not an instruction to carry out image capture in the text image capture mode is entered (S10). The user selects and enters the text image capture mode in a case where the user (i) carries out image capture with respect to a rectangular image capture object shape such as paper on which a text image is printed or a display screen on which the text image is displayed and (ii) wishes to output a captured image from the image output apparatus 200.

In the portable terminal apparatus 100 which has received the selection of the text image capture mode, the control section 109 controls the display section 105 to display a window which urges the user to enter, from the input section 106, a magnification of resolution conversion required for the high resolution correction. This allows the control section 109 to obtain the magnification which the user entered from the input section 106. The control section 109 determines, in accordance with the magnification, (i) the number of times of image capture is carried out by the image capture section 101 and (ii) a part of the process execution requirements which is used in the captured image determination section 102. Further, the control section 109 controls the display section 105 to display a window which urges the user to enter, from the input section 106, (i) a kind of an output process and (ii) a setting requirement for carrying out the output process. This allows the control section 109 to obtain output process information entered from the input section 106. Note that the control section 109 may store magnification of a default resolution conversion beforehand; in a case where no magnification is entered into the input section 106, this default magnification is set.

When detecting a shutter click, the image capture section 101 consecutively carries out image capture as many times as the control section 109 sets (S11).

Next, the image processing section 103 carries out at least the A/D conversion process with respect to sub-captured image data obtained by carrying out the image capture in S11. Then, the captured image determination section 102 determines whether or not the captured image data set which has been subjected to the A/D conversion process meet the process execution requirements (S12). Note that details of how to determine and items to be determined are as described earlier, for example, in (3-1) through (3-3).

In a case where the captured image determination section 102 determines that the process execution requirements are not met (NO in S12), the control section 109 controls the display section 105 to display a message urging image capture to be carried out again, so that the user is notified of the message (S13). In a case where even an image which has been captured again does not meet the determination items as mentioned above, the portable terminal apparatus 100 repeatedly carries out steps S11 through S13.

In contrast, in a case where the captured image determination section 102 determines that the process execution requirements are met (YES in S12), as described in the aforementioned (5), the correction information preparation section 110 prepares information indicative of locations of four edge pixel groups each in the form of a line segment, which edge pixel groups are detected from the captured image as geometric correction information (S14). Here, the geometric correction information is indicated by a function indicative of an approximate straight line of edge pixel groups each in the form of a line segment, where the upper left corner of the captured image serves as an origin, a horizontal axis serves as the X axis, and the vertical axis serves as the Y axis.

Next, the control section 109 causes the storage section 108 to store the captured image data set that meets the process execution requirements in such a manner that the captured image data set is associated with the geometric correction information prepared in S14 and the unoutputted flag (S15).

Thereafter, the control section 109 determines whether or not an instruction to transmit the output target image data to the image output apparatus 200 is entered into the input section 106 (S16). In the present embodiment, the portable terminal apparatus 100 and the image output apparatus 200 carry out communication by use of a short-distance wireless communication. Therefore, the user first comes close to the image output apparatus 200 carrying the portable terminal apparatus 100 with themselves, and then enters the transmission instruction.

If no transmission instruction is entered (NO in S16), the process returns back to S10. On the other hand, if the transmission instruction is entered (YES in S16), the designation information accepting section 111 reads out the captured image data set stored in the storage section 108, which captured image data set is assigned with the unoutputted flag, and causes the display section 105 to display an image indicated by the sub-captured image data that is captured first in the data set (S17). In a case where there are a plurality of captured image data sets that are assigned with the unoutputted flag, a data set that has the oldest (or newest) image capture time is selected, and a corresponding image of this data set is displayed.

Next, the designation information accepting section 111 determines whether or not an instruction to output just a partial region in the image is entered (S18). If such an instruction to output just a partial region in the image is entered (YES in S18), then the designation information accepting section 111 causes the display section 105 to display a message urging the user to enter four designated points for determining a quadrangle-shaped output target region. Next, the region determination section 112 determines, as described in (7), the quadrangle-shaped output target region based on the entered four designated points (see FIG. 9 or FIG. 10). Thereafter, the region extraction section 113 cuts out, from each of the sub-captured image data included in the respective captured image data set, image data (sub-designated region image data) of the output target region at a location where determined. The region extraction section 113 then causes the storage section 108 to store, as a designated region image data set, the set of the plurality of sub-designated region image data that have been cut out, in such a manner that the designated region image data set is associated with the captured image data set indicative of the captured image displayed in S17 (S19).

On the other hand, if an instruction is entered to not output just the partial region in the image (NO in S18), then the designation information accepting section 111 determines that the entire captured image is to be outputted, and no process is carried out.

Next, the control section 109 assigns a file name to the image data (output target image data) to be transmitted to the image output apparatus 200 (S20). Note that the control section 109 can automatically assign different file names for each plurality of pieces of captured image data, such as serial numbers which vary in accordance with image capture date and time) or can assign file names that are entered from the input section 106. As described above, in the case where the captured image data set is associated with the designated region image data set, the output target image data is the each designated region image data set, and in the case where the captured image data set is not associated with the designated region image data set, the output target image data is the captured image data set.

Thereafter, in accordance with control by the control section 109, the communication section 104 transmits to the image output apparatus 200, as one set, (i) the output target image data, (ii) output process information, (iii) geometric correction information, (iv) model information, and (v) user information (S21). At this time, the control section 109 deletes the unoutputted flag from the captured image data set corresponding to the transmitted output target image data, which captured image data set is stored in the storage section 108, and assigns the outputted flag indicating that the data has been subjected to output.

Next, the control section 109 determines whether or not all processes to the captured image have been completed (S22). The control section 109 here determines that not all the processes to the captured image is completed in a case where a captured image data set assigned with the unoutputted flag is still present in the storage section 108, and determines that all the processes to the captured image are completed in a case where none of such data set is present in the storage section 108. If not all the processes of the captured image are completed (NO in S22), the processes of S17 through S21 are carried out with respect to the captured image data set assigned with the unoutputted flags. In the case where all the processes of the captured image are completed (YES in S22), the process is terminated.

The following description deals with processing procedures of the image output apparatus 200, with reference to FIG. 18. The first communication section 207 of the image output apparatus 200 receives, from the portable terminal apparatus 100, the output target image data, the information on the model of the portable terminal apparatus 100, the user information, the output process information, and the geometric correction information (S20).

The image quality adjustment section 221 of the image processing section 202 carries out color balance correction and contrast correction with respect to all of sub-image data (sub-captured image data or sub-designated region image data) included in the received output target image data, for example as described in the aforementioned (10-1) (S21). In the case where the designated region flag is not assigned to the output target image data, which designated region flag indicates the output target image data is just a designated region and not the entire captured image, the lens distortion correction section 223 subsequently carries out lens distortion correction as described in the aforementioned (10-2), to the received output target image data.

Furthermore, the geometric correction section 222 carries out correction of geometric distortion and skew, based on the geometric correction information received from the portable terminal apparatus 100 (S32). In detail, the geometric correction section 222 defines a quadrangle-shaped region (uncorrected region) surrounded by the four straight lines indicated by the geometric correction information. Thereafter, the geometric correction section 222 obtains a mapping with respect to coordinates for converting the defined quadrangle-shaped uncorrected region to a rectangular standard region in which upper and lower sides are substantially parallel to each other in a horizontal direction and which standard region has a given aspect ratio and size. Further, the geometric correction section 222 carries out a mapping transformation process by use of the mapping, with respect to the output target image data received from the portable terminal apparatus 100. This makes it possible to output an image that has no geometric distortion.

Figure 19:
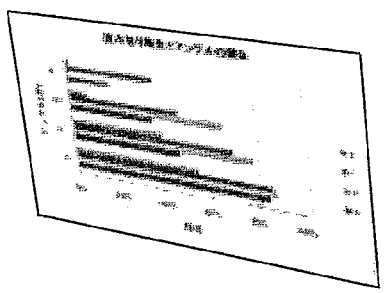
FIG. 19 is a view illustrating (i) an image indicated by image data that has not been subjected to geometric correction yet and (ii) an image indicated by image data that has been subjected to geometric correction.
Figure 19:
Figure 19:
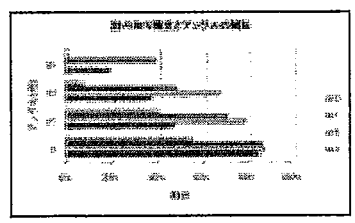

FIG. 19 is a view illustrating (i) an image indicated by image data which has not been subjected to geometric correction yet and (ii) an image represented by image data which has been subjected to geometric correction, in carrying out geometric correction to the designated region image data set cut out in FIG. 9. As illustrated in FIG. 19, the image indicated by the designated region image data set that has not been subjected to geometric correction yet is geometrically distorted at a time when the image is cut out as carried out in FIG. 9. Further, a distortion conversion formula prepared in S32 by the geometric correction section 222 eliminates the geometric distortion and converts the image of the image capture object to an image seen from its front. Therefore, as illustrated in FIG. 19, the image indicated by the image data which has been subjected to geometric correction becomes an image as though the image capture object is image captured from its front. As a result, visibility of the outputted image improves.

Next, the high resolution correction section 225 carries out high resolution correction with respect to the output target image data. Namely, the high resolution correction section 225 carries out high resolution correction by use of the plurality of sub-image data (sub-captured image data or sub-designated region image data) which are included in the output target image data and which have been subjected to various corrections in S31 and S32 (S33). In a case where the designation of the output target region is carried out, high resolution correction is carried out by use of (i) one piece of sub-image data that has been region designated, (ii) a coordinate of the designated region, and (iii) other plurality of pieces of sub-image data to which region designation has not been carried out. Details of how the high resolution correction is carried out is as described in (10-4).

Next, the output image processing section 224 carries out various image processing to high resolution image data obtained by carrying out high resolution correction in the high resolution correction section 225. Examples of the various image processing include a segmentation process, color correction, black generation and under color removal, spatial filter process, and halftone process. The output image processing section 224 varies what image processing to carry out as appropriate, depending on the type of outputting method indicated by the output process information. Thereafter, the output image processing section 224 causes the storage section 210 to store the image data that has been corrected (corrected image data) therein (S34). Note that, at this time, the output image processing section 224 causes the storage section 210 to store the corrected image data so that the corrected image data is stored associated with user information and output process information received together with output target image data from which the corrected image data originates.

Subsequently, the control section 212 determines whether or not an output instruction to output the output target image data is entered from the input section 206 (S35). In a case where no output instruction is entered (NO in S26), the control section 212 waits for the output instruction to be entered.

In contrast, in a case where the output instruction is entered (YES in S35), the certifying section 203 controls the display section 205 to display a window urging user information (such as a user ID or a password) to be entered from the input section 206. This allows the user information to be entered from the input section 206. Then, the certifying section 203 carries out user certification (S36). Note that the certifying section 203 can alternatively obtain the user information from a non-contact IC card possessed by the user with the use of a non-contact IC card reader/writer included in the image output apparatus 200.

During the user certification, the certifying section 203 (i) compares the user information entered from the input section 206 with the user information received from the portable terminal apparatus 100 and (ii) determines whether or not these pieces of information match each other (S37). In a case where the image output apparatus 200 receives, from the portable terminal apparatus 100, the user information which matches the user information entered from the input section 206 (YES in S37), the control section 212 controls the output process of the corrected image data so that the output process is carried out in accordance with the output process information received from the portable terminal apparatus 100, which corrected image data is associated with the user information and is stored in the storage section 210 in S34 (S38).

For example, in a case where the output process information is indicative of the printing process, the control section 212 causes the image forming section 204 to print an image indicated by the corrected image data. Moreover, in the case where the output process information indicates a filing process or an e-mail transmission process, the control section 212 causes the second communication section 208 to carry out the filing process or the e-mail transmission process based on the corrected image data. Thereafter, the processing flow is terminated.

In contrast, if the user information entered from the input section 206 does not match the user information received from the portable terminal apparatus 100 (NO in S37), the certifying section 203 determines whether or not the certification is carried out not less than a given times (S39). In a case where the certification is carried out less than the given times (NO in S39), S36 and S37 processes are repeated. In a case where the certification is carried out not less than the given times (YES in S39), the processing flow is terminated with no output.

As described above, according to the embodiment, it is possible to designate, as the output target region, just a required region of the captured image, image captured by the portable terminal apparatus 100. Further, it is possible to obtain, from the image output apparatus 200, image data of the designated output target region or an image indicated by this image data. Moreover, even if image capture is obliquely carried out with respect to the image capture object, the image is outputted in a state in which the image is mapping transformed to an image that is image captured from its front. Therefore, it is possible to attain an image having a good visibility. Further, since high resolution correction is carried out in the image output apparatus 200, it is also possible to improve readability of letters and the like.

(12) Modifications

The captured image processing system of the present invention is not limited to the description of the embodiment above, but can be variously modified. A specific example of a modified embodiment is described below.

(12-1) Cutout Process of Output Target Region (First Example)

The foregoing description dealt with a case where the region determination section 112 determines the output target region by use of any one method of (Method A) through (Method C), as illustrated in FIG. 17. However, editing and selecting the output target region determined by the region determination section 112 may be carried out with the portable terminal apparatus 100, based on instructions from the user.

Figure 25:
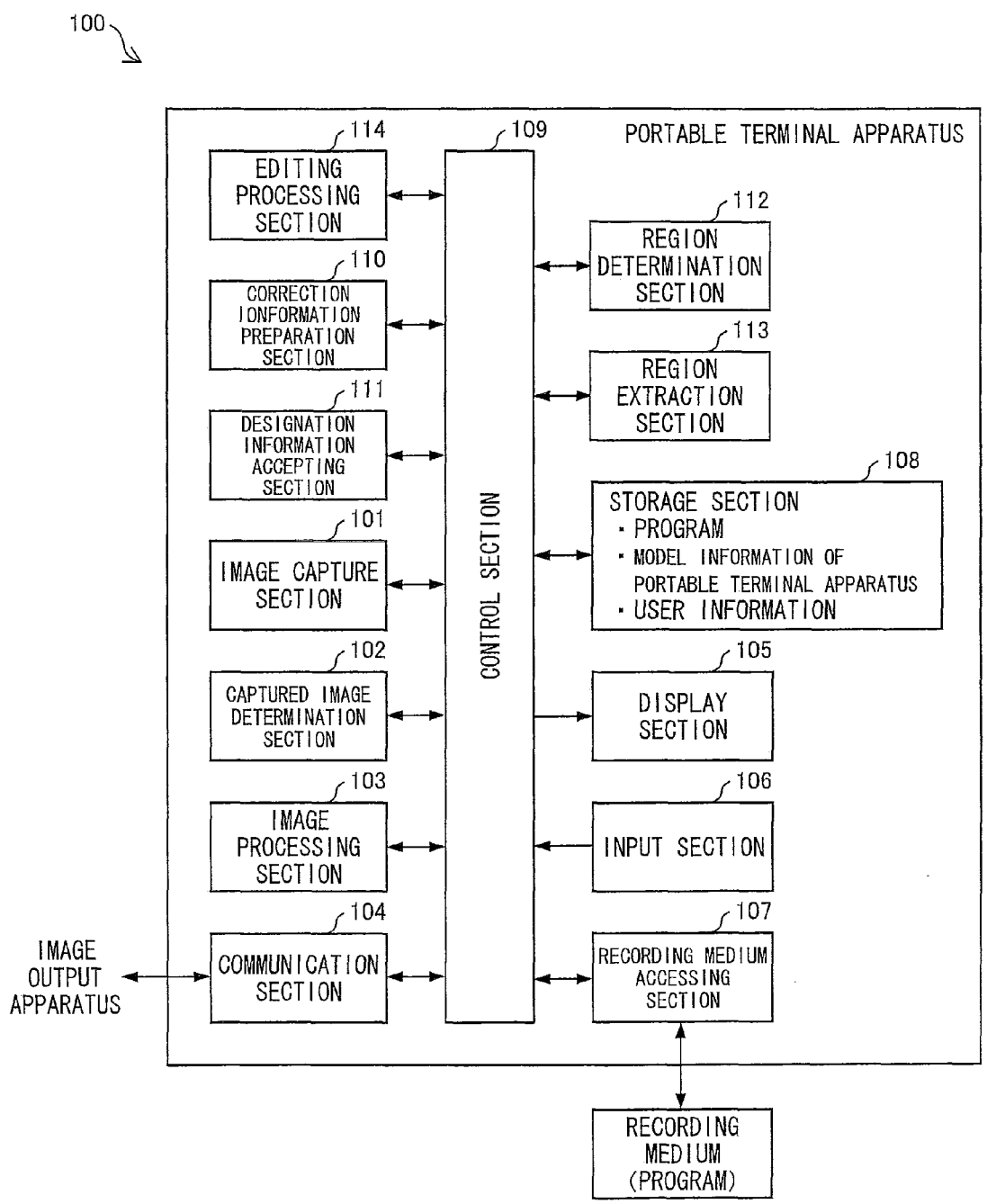
FIG. 25 is a block diagram illustrating an arrangement of a portable terminal apparatus in accordance with a modification.

FIG. 25 is a block diagram illustrating an arrangement of a portable terminal apparatus 100 in accordance with the present modification. The portable terminal apparatus 100 in accordance with the present modification differs from the portable terminal apparatus 100 illustrated in FIG. 2 in a point that an editing processing section 114 is included in the arrangement.

The editing processing section 114 carries out processes such as an editing process to the output target region determined by the region determination section 112 and a selection process of selecting a processing method to be carried out by the region determination section 112.

For example, the region determination section 112 may display the output target region determined by any one of the methods (Method A) to (Method C) as described above, and the editing processing section 114 may urge the user to input whether a processing result is good or poor. At this time, the region determination section 112 may cause display of just the output target region, or may display parts other than the output target region in a semitransparent manner so that the region selected is apparent among the entire captured image. Then, in the case where the user enters that the processing result is poor, the editing processing section 114 causes the region determination section 112 to carry out the determination process to the output target region again.

Moreover, the region determination section 112 may cause the display section 105 to display a plurality of output target region candidates prepared by two or three methods of the foregoing methods (Method A) through (Method C). The plurality of output target region candidates may be displayed one by one, or may be displayed as a thumbnail display. Thereafter, the editing processing section 114 may urge the user to select one output target region of the displayed plurality of output target regions, and determine the selected output target region candidate as the output target region. Then, the region extraction section 113 cuts out the output target region from all of the sub-captured image data, by use of the method used in the selected output target region candidate.

Alternatively, the editing processing section 114 may edit an output target region candidate prepared by the region determination section in line with an entry from the user, and determine the edited output target region candidate as the output target region.

Figure 26:
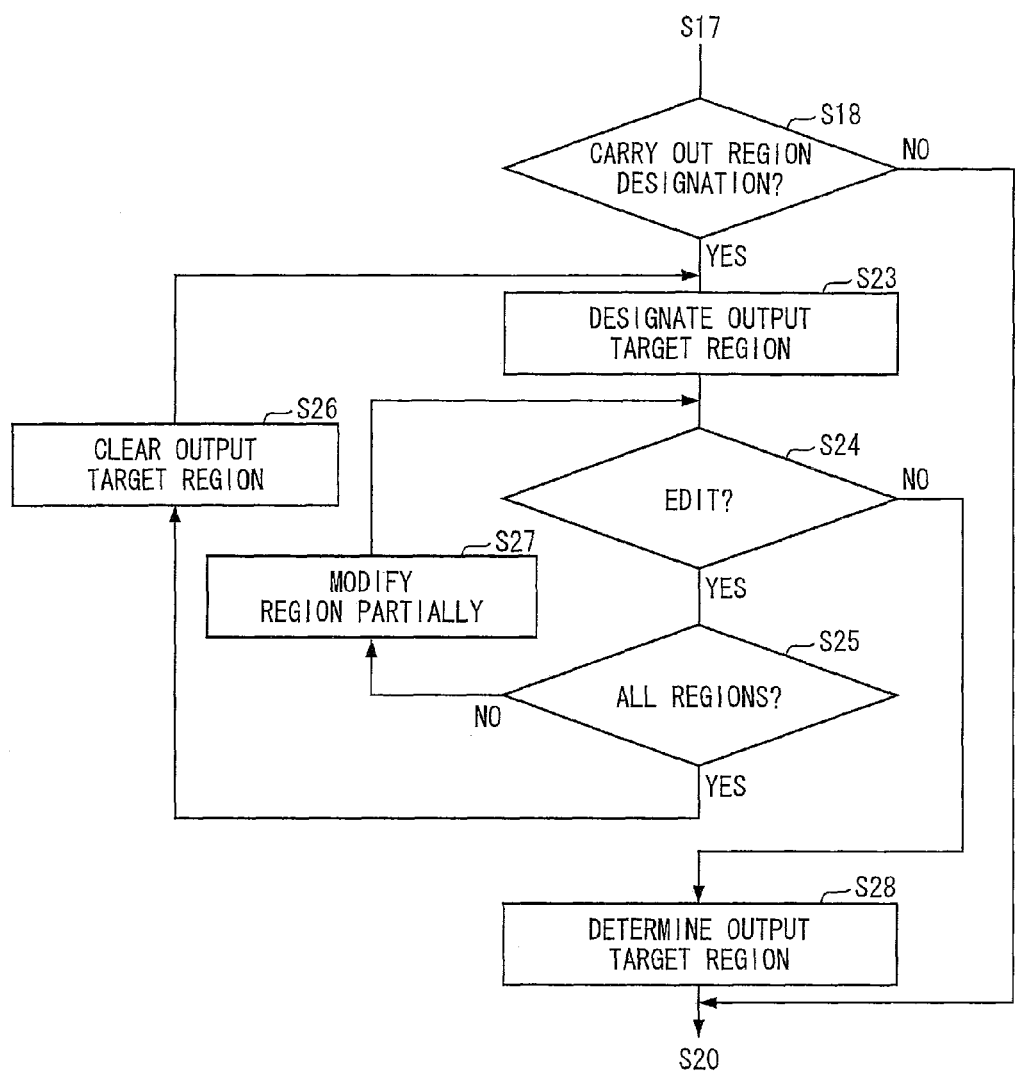
FIG. 26 is a flow chart illustrating one part of procedures carried out in a portable terminal apparatus that includes an editing processing section.

The following description specifically explains a flow of processes in the processing method of the present modification, with respect to a flow chart shown in FIG. 26. FIG. 26 is a flow chart showing a flow of processes that replace S19 in FIG. 17. Namely, in the present specific example, the processes in FIG. 26 are carried out after the processes of S10 to S18 in FIG. 17, and the processes of S20 to S22 in FIG. 17 are carried out subsequently to the processes of FIG. 26.

In the specific example shown in FIG. 26, if it is determined that region designation is to be carried out (Yes in S18), the region determination section 112 causes the display section 105 to display the output target region candidates prepared by any one method of the foregoing methods, (Method A)

through (Method C) (S23). At this time, a plurality of output target region candidates prepared by respective two or three methods of the (Method A) through (Method C) may first be displayed on the display section 105, and thereafter one output target region candidate selected in accordance with a selection instruction by the user may be displayed.

Then, the editing processing section 114 urges the user to enter whether or not there is a problem with (i.e., whether or not to edit) the displayed output target region candidate (S24). For example, the user is urged to press an "OK" button in a case where there is no problem with (no editing is to be carried out to) the displayed output target region candidate, and is urged to press a "NO" button in a case where there is a problem with the displayed output target region candidate, and is judged that revision is necessary (editing is to be carried out) to the output target region candidate.

In the case where the "OK" button is pressed (No in S24), the region determination section 112 determines the output target region candidate displayed in S23 as the output target region (S28).

On the other hand, if an instruction is entered that revision is necessary (Yes in S24), the editing processing section 114 urges the user to selectively enter whether an entire revision is required to the displayed output target region candidate or just a partial edit is required to the displayed output target region candidate (S25). If the output target region is to be entirely revised (Yes in S25), the editing processing section 114 deletes the output target region candidate displayed in S23, and causes the region determination section 112 to carry out the process of S23 again, to update the output target region candidate (S26). At this time, the editing processing section 114 may instruct the region determination section 112 to prepare an output target region candidate by use of a different method from the method used in S23 previously.

On the other hand, if the output target region candidate is to be just partially revised (No in S25), the editing processing section 114 displays the four designated points corresponding to the output target region candidate displayed in S23, and urges the user to select which designated point to revise. Selection of the designated point may be made, for example, by touching the subject point by use of a finger or a pentip. Upon selection of a designated point, for example arrows (adjustment buttons) of up and down, left and right, and oblique (upper right, upper left, lower right, lower left) directions are displayed to allow moving the point by pressing the arrows; after adjusting a location of the point, the location is entered as a determined location by pressing an "OK" button. In a case where a plurality of designated points are to be revised, the output target region candidate determined in accordance with the corrected designated points may be displayed every time one point is corrected, or the output target region candidate determined in accordance with the corrected designated points may be displayed upon correction of all the points that require revising. In the case where the output target region candidate determined in accordance with the corrected designated point is displayed every time one point is corrected, the correction of the remaining points may be discontinued once the user judges that there are no more problems. In the case where the partial revision is carried out, the revision may be carried out while enlarging the display, as aforementioned. As such, the editing processing section 114 edits the output target region candidate by determining the output target region candidate in accordance with the corrected designated points (S27).

Thereafter, the editing processing section 114 urges the user to enter whether or not to re-edit the output target region candidate determined in accordance with the corrected designated points (S24). In a case where an instruction is entered that no editing is to be carried out (No in S24), the editing processing section 114 determines the output target region candidate in accordance with the newest corrected designated points as the output target region (S28).

Note that in S26 and S27, the editing processing section 114 may once store, in a memory, the deleted output target region candidate or the output target region candidate yet to be edited, and thereafter cause the display section 105 to display these output target region candidates together with the updated or corrected output target region candidate, and urge the user to select their preferred data.

(12-2) Cutout Process of Output Target Region (Second Example)

In the foregoing description, the portable terminal apparatus 100 cuts out an output target region from the captured image data, and transmits to the image output apparatus 200 a designated region image data set indicating just an image of the output target region. However, the cutout process of the output target region may be carried out in the image output apparatus 200.

Namely, in the foregoing description, all of the designation information accepting section 111, region determination section 112 and region extraction section 113 (and editing processing section 114) are provided in the portable terminal apparatus 100. However, a first modified embodiment of the present captured image processing system may be arranged so that the portable terminal apparatus 100 includes the designation information accepting section 111 and the image output apparatus 200 includes the region determination section 112 and region extraction section 113 (and also the editing processing section 114). Alternatively, a second modified embodiment of the present captured image processing system may be arranged so that the portable terminal apparatus 100 includes the designation information accepting section 111 and region determination section 112 (and also the editing processing section 114), and the image output apparatus 200 includes the region extraction section 113.

In these cases, the designated region image data set is not prepared in the portable terminal apparatus 100. Hence, the control section 109 of the portable terminal apparatus 100 handles the captured image data set as the output target image data. Moreover, in the case of the first modified embodiment, the communication section 104 of the portable terminal apparatus 100 transmits, to the image output apparatus 200, designation information accepted by the designation information accepting section 111, together with the captured image data set. Thereafter, the region determination section 112 of the image output apparatus 200 determines the output target region based on the captured image data set and designation information which are received from the portable terminal apparatus 100, by use of one of methods A through C described in the foregoing (7). Subsequently, the region extraction section 113 of the image output apparatus 200 cuts out the output target region from the captured image data set.

Moreover, in the case of the second modified embodiment, the communication section 104 of the portable terminal apparatus 100 transmits, to the image output apparatus 200, output target region information indicative of a position of the output target region on the captured image together with the captured image data set, which output target region is determined by the region determination section 112. The region extraction section 113 of the image output apparatus 200 then just requires cutting out the output target region from the captured image data set.

Although the amount of transmitted data increases, it is possible to reduce load given to the portable terminal apparatus 100 in carrying out the processes.

FIG. 20 is a block diagram illustrating an arrangement of an image processing section 202a of an image output apparatus 200 in the second modified embodiment. As illustrated in FIG. 20, the image processing section 202a of the present modification differs from the image processing section 202 described in the foregoing description in that the image processing section 202a includes a region extraction section 113. The region extraction section 113 cuts out the output target region from the captured image data set, based on the output target region information received from the portable terminal apparatus 100.

The region extraction section 113 cuts out an output target region indicated by the output target region information received from the portable terminal apparatus 100, from each of the plurality pieces of sub-designated region image data included in the captured image data set to which the output target region information is assigned.

The region extraction section 113 may cut out the output target region from the sub-captured image data before carrying out the process of S32 shown in FIG. 18, or may cut out the output target region from the sub-captured image data after carrying out the process of S32 shown in FIG. 18.

In the case where the region extraction section 113 cuts out the output target region after the process of S32 shown in FIG. 18, the region extraction section 113 converts the output target region information by use of a mapping prepared by the geometric correction section 222. Further, the region extraction section 113 may cut out the converted output target region from sub-captured image data which has been subjected to geometric correction in S32. For example, in a case where the output target region information is coordinates of four angular points of a rectangular output target region, coordinate conversion is carried out to each of the coordinates, based on the mapping prepared by the geometric correction section 222. Thereafter, a region having the converted four coordinates as their angular points is served as the output target region which has been subjected to conversion, and this region is cut out from the sub-captured image data to which geometric correction is carried out.

(12-3) Subject of Preparing Geometric Correction Information

In the foregoing description, the correction information preparation section 110 of the portable terminal apparatus 100 is described as a section for preparing the geometric correction information. However, in the case described in (12-1) in which the entire captured image data is transmitted from the portable terminal apparatus 100 to the image output apparatus 200 and the output target region is cut out in the image output apparatus 200, a subject to prepare the geometric correction information can be the image output apparatus 200. That is to say, the image processing section 202 or 202a of the image output apparatus 200 may include the correction information preparation section 110. Further, similarly to the captured image determination section 102, the correction information preparation section 110 detects from the captured image data received from the portable terminal apparatus 100 a quadrangle having edge pixel groups, each pixel group being in the form of a line segment, serve as sides of the quadrangle, so as to prepare the geometric correction information indicative of the locations of the four edge pixel groups.

(12-4) Geometric Correction Information Preparation Method

In the foregoing description, the correction information preparation section 110 prepares geometric correction information based on edge pixel groups each in the form of a line segment, which edge pixel groups are detected from the captured image data. However, in a case where image capture is carried out with respect to a document including a text image as an image capture object, the user often designates, as the output target region, a quadrangle region having parallel sides to respective sides of the document. Namely, such are cases in which the document is designated as the output target region by the whole, or a table or graph included in the document is designated as the output target region. Accordingly, the correction information preparation section 110 may prepare the geometric correction information based on the output target region accepted by the designation information accepting section 111. In this case, the correction information preparation section 110 prepares information indicative of locations of four sides of a quadrangle-shaped output target region, as the geometric correction information.

Moreover, in this case, the correction information preparation section 110 may check whether or not a connecting component of the edge pixel having a given shape is present in a block including the designated points indicated by the four coordinates accepted by the designation information accepting section 111, as described in (Method C) of the foregoing (7). In a case where the connecting component exists, information indicative of the locations of four sides of the quadrangle serve as the geometric correction information, which quadrangle has corner sections of connecting components in the edge pixels serve as angular points of the quadrangle; in a case where the connecting component does not exist, information indicative of locations of four sides of the output target region determined by the region determination section 112 is prepared as the geometric correction information.

More specifically, as illustrated in FIG. 9, the correction information preparation section 110 classifies the designated points indicated by the four coordinates accepted by the designation information accepting section 111 into: an upper left designated point P1, an upper right designated point P2, a lower left designated point P3, and a lower right designated point P4. Then, the correction information preparation section 110 defines, in the sub-captured image data, blocks of several ten pixels (e.g., 20 to 30 pixels)×several ten pixels (e.g., 20 to 30 pixels) in which respective designated points serve as their centers, and then the edge pixels in each of the blocks are detected. Subsequently, the correction information preparation section 110 connects adjacent edge pixels in each of the blocks, and determines whether or not the connected plurality of edge pixels form a given referential shape (see FIG. 21). This determination method is as described in (Method C) in the foregoing (7). Further, in the case where the shape of the edge pixels is determined as the given referential shape, the correction information preparation section 110 selects, as a candidate point, a pixel constituting a corner section of the edge pixels among the extracted edge pixels, and in the case where the shape of the edge pixels is not determined as the given reference shape, the correction information preparation section 110 selects the designated point accepted by the designation information accepting section 111 as the candidate point. Thereafter, the correction information preparation section 110 prepares, as the geometric correction information, information indicating locations of each of sides of a quadrangle which has the four candidate points serve as angular points of the quadrangle.

(12-5) Preparation of Designation Information by Designation Information Accepting Section In the foregoing description, the designation information accepting section 111 accepts entry of four designated points. However, the designation information accepting section 111 may accept just two or three designated points, and determine any remaining points to be designated.

In a case where entry of two designated points are accepted, the designation information accepting section 111 urges the user to enter an upper left corner point and lower right corner point of the quadrangle-shaped designated region, in order to determine the output target region. Then, the designation information accepting section 111 determines the remaining points to be designated based on an approximate straight lines of the first to fourth edge pixel groups detected by the captured image determination section 102 (see broken line in FIG. 7).

In detail, the designation information accepting section 111 defines, as a second designated point, an intersection of (i) a straight line which passes through a first designated point and which is parallel to the approximate straight line of the first edge pixel group and (ii) a straight line which passes through a fourth designated point and which is parallel to the approximate straight line of the second edge pixel group, where a point entered as the point at the upper left corner is the first designated point, and a point entered as the point at the lower right corner is the fourth designated point. Furthermore, the designation information accepting section 111 defines, as a third designated point, an intersection of (i) a straight line which passes through the first designated point and which is parallel to an approximate straight line of the third edge pixel group and (ii) a straight line which passes through the fourth designated point and which is parallel to an approximate straight line of the fourth edge pixel group. This allows the designation information accepting section 111 to output designation information indicative of coordinates of the four designated points, and allows the region determination section 112 to determine the output target region.

Moreover, in a case where entry of three designated points is accepted, the remaining point is calculated similarly to the above. In this case, the designation information accepting section 111 urges the user to enter, for example, an upper left corner point, upper right corner point, and lower left corner point of the quadrangle designated region used to determine the output target region. Then, the designation information accepting section 111 determines the remaining designated point based on the approximate straight lines of the first through fourth edge pixel groups (see broken line of FIG. 7) detected by the captured image determination section 102.

In details, the designation information accepting section 111 just requires to define, as a fourth designated point, an intersection of (i) a straight line which passes through a third designated point and which is parallel to the approximate straight line of the fourth edge pixel group and (ii) a straight line which passes through a second designated point and which is parallel to the approximate straight line of the second edge pixel group, where a point entered as the upper left corner point is the first designated point, a point entered as the upper right corner point is the second designated point, and a point entered as the lower left corner point is the third designated point.

(12-6) Determination Method of Output Target Region

In cases such as a case where edges of an image capture object is judged as clear or a case where an image has a clear contrast, the region determination section 112 may determine the output target region as described below. Whether or not the edges of the image capture object is judged as clear or whether or not the image has a clear contrast may be determined based on an entry from the user. That is to say, the region determination section 112 may display the captured image to the user, and cause the user to enter whether or not the edges of the image capture object is clear or whether or not the image has a clear contrast. Alternatively, the region determination section 112 may judge that the contrast is clear in a case where features indicative of contrast, such as a difference between the maximum and minimum values of the pixel values obtained in the sub-captured image data, are not less than a given threshold. This is later described.

First, the designation information accepting section 111 urges the user to designate with their finger or with a touch pen, an arbitrary point within a region in which the user wishes to output, to obtain information indicating a location of the designated one point.

Then, the region determination section 112 defines a quadrangle-shaped region that includes the one point thus designated and that is surrounded by the four edge pixel groups each in the form of a line segment detected by the captured image determination section 102. Thereafter, the region determination section 112 sets the locations of the four edge pixel groups to have a maximum brightness value (displays the edge pixel groups in a highlighted manner) in the captured image displayed on the display section 105. Furthermore, the region determination section 112 causes the display section 105 to display a screen urging the user to enter an instruction as to whether the region surrounded by the highlighted edge pixel groups is to be the output target region. If the user enters an instruction to have the region surrounded by the highlighted edge pixel group be the output target region, the region determination section 112 makes the region surrounded by the highlighted edge pixel group serve as the output target region.

Note that if an instruction to not have the region surrounded by the highlighted edge pixel group be the output target region is entered, the designation information accepting section 111 and the region determination section 112 causes display of a screen that urges the user to enter four designated points, as described in (6) and (7). Accordingly, the output target region is determined based on the entered designated points.

(12-7) Number of Times of Image Capture

According to the above description, the control section 109 of the portable terminal apparatus 100 causes the image capture section 101 to carry out image capture as many times as the number of the captured images required for the high resolution correction. Namely, the control section 109 sets, (i) the number of times of image capture and (ii) the number of pieces of sub-captured image data which is required in the process execution requirements, so that the number (i) is equal to the number (ii). However, the control section 109 can set the number (i) and the number (ii) so that the number (i) is greater than the number (ii). For example, in the case where the magnification of the resolution conversion is set to ×2, it is possible to set the number of times of image capture to "3" while the number of pieces of sub-captured image data required in the process execution requirements is set to "2".

In a case where the number of times of image capture is thus larger than the number of pieces of sub-captured image data required in the process execution requirements, it is necessary for the captured image determination section 102 to only determine whether or not there exists, in the sub-captured image data whose number is equal to the number of times of image capture, a combination of sub-captured image data which meets the process execution requirements. For example, in a case where the number of times of image capture is "3" while the required number is "2", there exist three combinations of the required number of pieces of the sub-captured image data in the three pieces of sub-captured image data. In this case, the captured image determination section 102 sequentially determines whether or not the three combinations meet the process execution requirements. Upon confirming a combination which meets the process execution requirements, the captured image determination section 102 terminates the determination processes. Then, the communication section 104 transmits, to the image output apparatus 200, the sub-captured image data included in the combination. Alternatively, the captured image determination section 102 can determine whether or not all the combinations meet the process execution requirements. In this case, when a plurality of the combinations meet the process execution requirements, the control section 109 can select the combination whose detected offset amount is the closest to a median of a given range, and transmits the combination to the image output apparatus 200. For example, in a case where the given range is 0.3 to 0.7, the combination whose offset amount is the closest to 0.5 is selected.

(12-8) Another Example of High Resolution Correction

According to the foregoing description, a high resolution reconstructed image data is prepared from a plurality of pieces of sub-captured image data. However, high resolution correction may be carried out based on not the plurality pieces of image data, but based on a single piece of image data.

As for a method for forming a high resolution image in accordance with a single piece of image data, several methods are disclosed in the Journal of the Institute of Image Information and Television Engineers Vol. 62, No. 2, pp. 181 through 189 (published in 2008).

Generally, it is possible to carry out the high resolution correction by (i) detecting a direction of an edge of an image pattern so as to carry out an interpolation in accordance with the direction of the edge and (ii) carrying out a de-noising process so as to remove at least (a) a distortion due to the interpolation and (b) an influence of a noise component existing in an inputted image. This is described below in detail.

Figure 22:
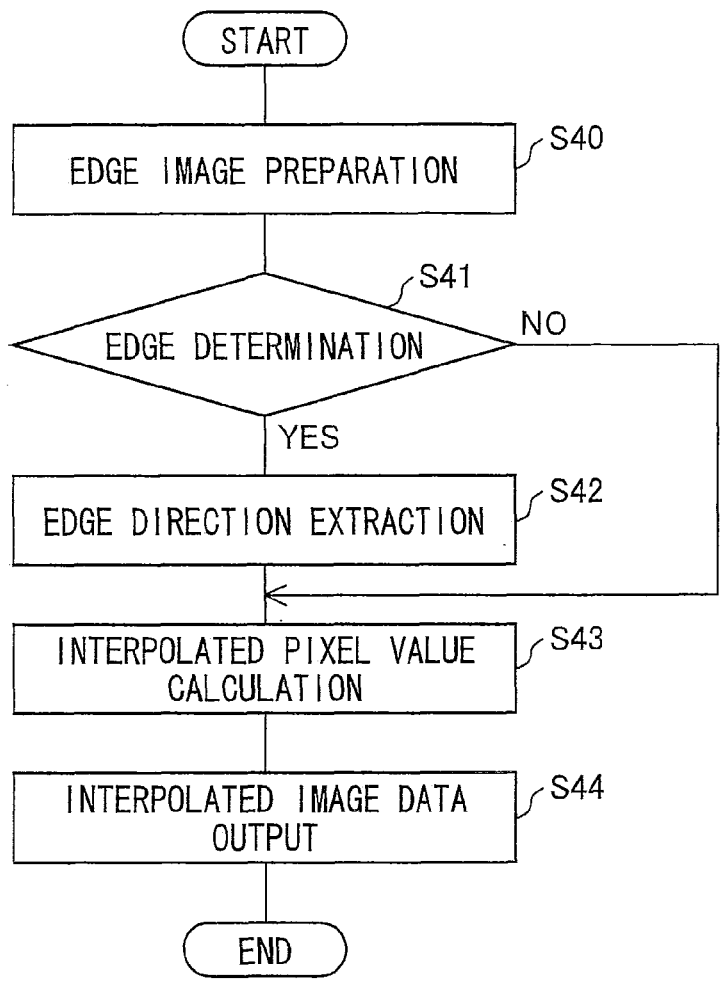
FIG. 22 is a flow chart illustrating another processing flow of a high resolution correction.

FIG. 22 is a flow chart illustrating a processing flow of the high resolution correction carried out in the present embodiment.

Figure 23:
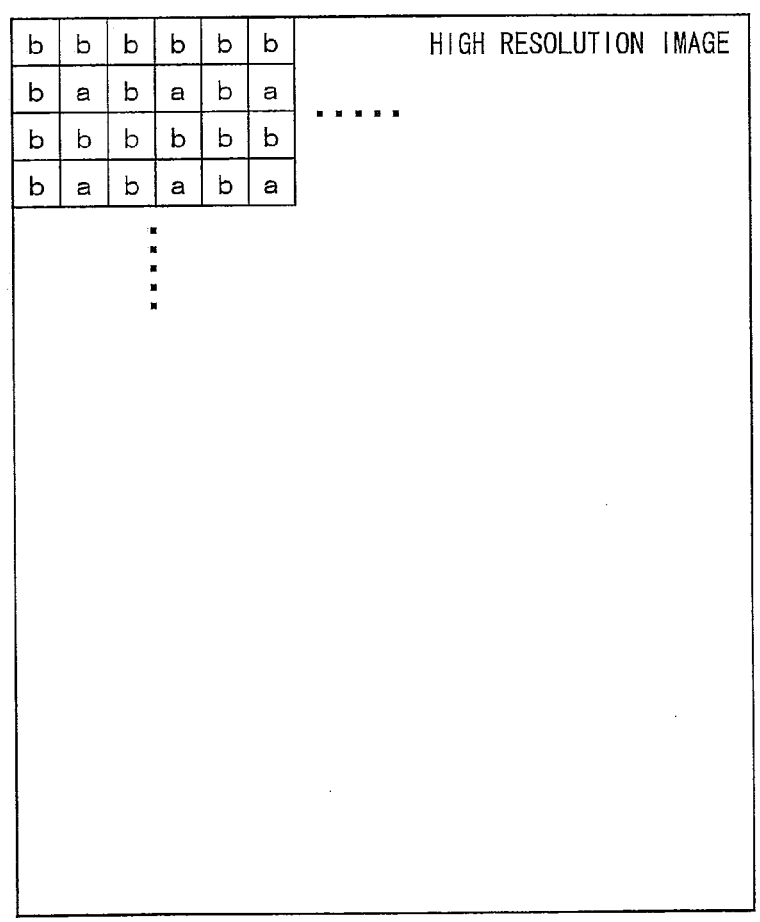
FIG. 23 illustrates reference pixels and interpolated pixels in high resolution image data.

Note that an example of a resolution conversion carried out at a magnification of ×2 in each of transverse and longitudinal directions is described here. In a case where (i) the resolution conversion is carried out at the magnification of ×2 and (ii) the number of pixels included in the captured image data which is to be subjected to the high resolution correction is n×m, the number of pixels included in the captured image data which has been subjected to the high resolution correction is 2n×2m. Such a high resolution correction (the resolution conversion carried out at the magnification of ×2) is carried out by preparing, as high resolution image data, image data including both reference pixels and interpolated pixels. The reference pixels are the respective pixels included in the captured image data, and the interpolated pixels are newly prepared in the middle of the respective reference pixels. FIG. 23 shows a relationship between a reference pixel and an interpolated pixel. In FIG. 23, a pixel "a" and a pixel "b" indicate the reference pixel and the interpolated pixel, respectively.

First, the high resolution correction section 225 carries out an edge extraction with respect to the captured image data received by the first communication section 207. For example, the high resolution correction section 225 carries out the edge extraction by use of a first order differential filter as shown in FIG. 8. Then, the high resolution correction section 225 carries out a binarization process so as to prepare binary image data (S40). Note that a pixel which has a pixel value of 1 in the binary image data shows that the pixel is highly likely to be an edge.

Next, the high resolution correction section 225 determines, in accordance with the binary image data prepared in S40, whether or not a target pixel included in the captured image data is an edge (S41). Specifically, the high resolution correction section 225 determines that the target pixel is an edge when a pixel, which corresponds to the target pixel in the binary image data, has a pixel value of 1.

Note that the target pixel intends a pixel which is currently targeted in a case where the pixels in the captured image data are targeted in any order.

In a case where the target pixel is an edge (Yes in S41), the high resolution correction section 225 detects an edge direction by use of a partial image corresponding to (N×N) pixels (N>1) which includes the target pixel (S42). In detail, the high resolution correction section 225 determines whether or not each of the reference pixels in the partial image corresponding to (N×N) pixels is an edge pixel. Then, in a case where a reference pixel on the upper left of the target pixel and a reference pixel on the lower right of the target pixel are respective edge pixels, the high resolution correction section 225 determines that the edge direction of the partial image is an upper left-lower right direction. Similarly, in a case where a reference pixel on the left of the target pixel and a reference pixel on the right of the target pixel are respective edge pixels, the high resolution correction section 225 determines that the edge direction is a left-right direction. In a case where a reference pixel on the upper side of the target pixel and a reference pixel on the lower side of the target pixel are respective edge pixels, the high resolution correction section 225 determines that the edge direction of the partial image is an upper-lower direction. In a case where a reference pixel on the upper right of the target pixel and a reference pixel on the lower left of the target pixel are respective edge pixels, the high resolution correction section 225 determines that the edge direction of the partial image is an upper right-lower left direction.

In FIG. 24, a dotted line indicates a detected edge direction. Note, in FIG. 24, that pixels (1) through (9) are respective reference pixels and the pixel (5) is a target pixel. Note also that pixels A, B, and C are (i) an interpolated pixel between the reference pixels (1) and (5), (ii) an interpolated pixel between the reference pixels (2) and (5), and (iii) an interpolated pixel between the reference pixels (4) and (5), respectively.

Next, the high resolution correction section 225 calculates, in accordance with the edge direction detected in S42, pixel values of the respective interpolated pixels A, B, and C which are located (i) on the upper left, (ii) on the upper side, and (iii) on the left, respectively, of the target pixel. Note here that the pixel values of the respective interpolated pixels are calculated by use of the reference pixels located in the edge direction.

In a case where the edge direction is the upper left-lower right direction, the reference pixels (1), (5), and (9) are respective edge pixels and a straight line connecting these pixels serves as an edge line (see FIG. 24(a)). Then, a pixel value VA (note that a written expression of "V" is omitted in FIG. 24 and this is applied to the other pixel values) of the interpolated pixel A located on the edge line is calculated based on the equation of VA=(V(1)+V(5))/2, by use of pixel values (a pixel value V(1) and a pixel value V(5)) of the reference pixel (1) and the reference pixel (5), respectively, each being adjacent to the interpolated pixel A located on the edge line.

In contrast, with respect to each of the interpolated pixels B and C located on no edge line, the interpolation is carried out by use of the reference pixels located on straight lines which (i) include the reference pixels which are different from those located on the edge line and the closest to the respective interpolated pixels B and C (hereinafter such a reference pixel is referred to as a closest reference pixel) and (ii) are parallel to the edge direction. For example, as for the interpolated pixel B, the straight line which (i) includes the reference pixel (2) which is the closest reference pixel and (ii) is parallel to the edge line is a straight line connecting the reference pixels (2) and (6) (see FIG. 24(a)). Then, a point, which is perpendicularly drawn from the interpolated pixel B to the straight line, causes a line segment defined by the reference pixels (2) and (6) to be internally divided. Therefore, a pixel value VB of the interpolated pixel B is calculated by use of the following equation: $VB=(9\times V(2)+4\times V(6))/13$.

Similarly, a pixel value VC of the interpolated pixel C is calculated based on the equation of $VC=(9\times V(4)+4\times V(8))/13$, by use of (i) a pixel value of the reference pixel (4) which is the closest reference pixel value and (ii) a pixel value of the reference pixel (8) which is located on a straight line which includes the reference pixel (4) and is parallel to the edge direction.

In a case where the edge direction is the left-right direction, the reference pixels (4), (5), and (6) are edge pixels and a straight line connecting these pixels serves as the edge line (see FIG. 24(b)). Then, the pixel value VC of the interpolated pixel C located on the edge line is calculated based on the equation of $VC=(V(4)+V(5))/2$, by use of the pixel values (pixel values V(4) and V(5)) of the reference pixel (4) and the reference pixel (5), respectively, each being adjacent to the interpolated pixel C located on the edge line.

In contrast, with respect to each of the interpolated pixels A and B located on no edge line, the interpolation is carried out by use of the reference pixels located on straight lines which (i) include the reference pixels which are different from those located on the edge line and the closest to the respective interpolated pixels A and B (the closest reference pixels) and (ii) are parallel to the edge direction. For example, as for the interpolated pixel A, the straight line which (i) includes the reference pixel (1) or the reference pixel (2) which is the closest reference pixel and (ii) is parallel to the edge line is a straight line connecting the reference pixels (1) and (2) (see FIG. 24(b)). Then, a point, which is perpendicularly drawn from the interpolated pixel A to the straight line, exists in the middle of the reference pixels (1) and (2). Therefore, the pixel value VA of the interpolated pixel A is calculated by use of the following equation: $VA=(V(1)+V(2))/2$.

As for the interpolated pixel B, the straight line which (i) includes the reference pixel (2) which is the closest reference pixel and (ii) is parallel to the edge line is a straight line connecting the reference pixels (1), (2), and (3). Then, a point, which is perpendicularly drawn from the interpolated pixel B to the straight line, coincides with the reference pixel (2). Therefore, the interpolated pixel B is set to have the pixel value VB which is identical to the pixel value V(2) of the reference pixel (2).

In a case where the edge direction is the upper right-lower left direction, the reference pixels (3), (5), and (7) are edge pixels and a straight line connecting these pixels serves as the edge line (see FIG. 24(c)). Then, none of the interpolated pixels A, B, and C exists on the edge line.

As for the interpolated pixel A, the reference pixels (1), (2), and (4) are the closest reference pixels. Note here that the reference pixels (2) and (4) are located on a single straight line which is parallel to the edge direction, whereas the reference pixel (1) is not located on the single straight line. In view of this, the pixel value VA of the interpolated pixel A is calculated based on the equation of $VA=(V(1)+V(2))+V(4)/3$, by use of the pixel values of the respective reference pixels (1), (2), and (4) which are the closest reference pixels.

In contrast, with respect to each of the interpolated pixels B and C, the interpolation is carried out by use of the reference pixels located on straight lines which (i) include the reference pixels which are different from those located on the edge line and the closest to the respective interpolated pixels B and C (the closest reference pixels) and (ii) are parallel to the edge direction. For example, as for the interpolated pixel B, the straight line which (i) includes the reference pixel (2) which is the closest reference pixel and (ii) is parallel to the edge line is a straight line connecting the reference pixels (2) and (4) (see FIG. 24(c)). Then, a point, which is perpendicularly drawn from the interpolated pixel B to the straight line, causes a line segment defined by the reference pixels (2) and (4) to be internally divided. Therefore, the pixel value VB of the interpolated pixel B is calculated by use of the following equation: $VB=(9\times V(2)+4\times V(4))/13$.

Similarly, the pixel value VC of the interpolated pixel C is calculated based on the equation of $VC=(4\times V(2)+9\times V(4))/13$, by use of (i) the pixel value of the reference pixel (4) which is the closest reference pixel value and (ii) the pixel value of the reference pixel (2) which is located on the straight line which includes the reference pixel (4) and is parallel to the edge direction.

In a case where the edge direction is the upper-lower direction, the reference pixels (2), (5), and (8) are edge pixels and a straight line connecting these pixels serves as the edge line (see FIG. 24(d)). Then, the pixel value VB of the interpolated pixel B located on the edge line is calculated based on the equation of $VC=(V(2)+V(5))/2$, by use of the pixel values of the respective reference pixels (2) and (5) each being adjacent to the interpolated pixel B located on the edge line.

In contrast, with respect to each of the interpolated pixels A and C located on no edge line, the interpolation is carried out by use of the reference pixels located on straight lines which (i) include the reference pixels which are different from those located on the edge line and the closest to the respective interpolated pixels A and C (the closest reference pixels) and (ii) are parallel to the edge direction. For example, as for the interpolated pixel A, the straight line which (i) includes the reference pixel (1) or the reference pixel (4) which is the closest reference pixel and (ii) is parallel to the edge line is a straight line connecting the reference pixels (1) and (4) (see FIG. 24(d)). Then, a point, which is perpendicularly drawn from the interpolated pixel A to the straight line, exists in the middle of the reference pixels (1) and (4). Therefore, the pixel value VA of the interpolated pixel A is calculated by use of the following equation: $VA=(V(1)+V(4))/2$.

As for the interpolated pixel C, the straight line which (i) includes the reference pixel (4) which is the closest reference pixel and (ii) is parallel to the edge line is a straight line connecting the reference pixels (1), (4), and (7). Then, a point, which is perpendicularly drawn from the interpolated pixel C to the straight line, coincides with the reference pixel (4). Therefore, the interpolated pixel C is set to have the pixel value VC which is identical to the pixel value V(4) of the reference pixel (4).

Note that information, in which (i) an edge direction and (ii) equations for calculating the pixel values of the respective interpolated pixels A, B, and C are associated with each other, is preliminarily stored in the storage section 210. The high resolution correction section 225 reads out, from the storage section 210, the equations associated with the edge direction detected in S42, and then can calculate the pixel values of the respective interpolated pixels A, B, and C in accordance with the equations thus read out.

Note that FIG. 24 illustrates only a case where the edges linearly extend. Note, however, that the edges can extend in a curved manner in the partial image corresponding to (N×N) pixels. Examples of the case include a case where the edge extends along the reference pixels (2)-(5)-(4) and a case where the edge extends along the reference pixels (1)-(5)-(7). Even in each of such cases, information, in which (i) edge directions and (ii) equations for calculating pixel values of respective interpolated pixels A, B, and C are associated with each other, is preliminarily stored. For example, in the case where the edge extends along the reference pixels (2)-(5)-(4), equations similar to those in the cases of FIGS. 24 (c), 24 (b), and 24 (d) are stored with respect to the interpolated pixels A, B, and C, respectively. Similarly, in the case where the edge extends along the reference pixels (1)-(5)-(7), equations similar to those in the cases of FIGS. 24(a), 24(a), and 24(d) are stored with respect to the interpolated pixels A, B, and C, respectively. Also in a case where the edge extends differently from the above, the foregoing information is similarly stored.

As described above, the high resolution correction section 225 calculates the pixel values of the respective interpolated pixels located in the vicinities of the respective reference pixels which have been determined to be the edge pixels.

In contrast, in a case where the target pixel is not an edge (No in S41), the high resolution correction section 225 calculates, by a general interpolation calculating method (e.g., a bilinear interpolation method or a bicubic interpolation method), the pixel values of the respective interpolated pixels A, B, and C which are located (i) on the upper left side, (ii) on the upper side, and (iii) on the left side, respectively, of the target pixel so as to be adjacent to the target pixel (S43).

The high resolution correction section 225 carries out the processes S41 through S43 with respect to all the reference pixels included in one image data. This causes interpolated image data including both the reference pixels and the interpolated pixels to be prepared (S44).

Thereafter, the high resolution correction section 225 carries out an image quality enhancement process with respect to the interpolated image data thus prepared. For example, the interpolated image data is subjected, by the high resolution correction section 225, to a de-noising filter, a sharpening filter, and the like so that high resolution image data is prepared. Examples of the sharpening filter include a conventional unsharp mask and a filter in which a coefficient at the center of FIG. 9 is set to five (5). Note that a median filter is widely known as the de-noising filter. As for a more sophisticated method for the image quality enhancement, a Bilateral filter [Proceedings of the 1998 IEEE International Conference on Computer Vision] or the like can be used as a method having both an edge preserving property and an image quality enhancing property.

Note that a method for preparing high resolution image data is not limited to the methods described above, and the high resolution correction section 225 can prepare the high resolution image data in accordance with a single piece of captured image data by use of a variety of methods as disclosed in the Journal of the Institute of Image Information and Television Engineers Vol. 62, No. 2, pp. 181 through 189 (published in 2008).

Moreover, in a case where the high resolution image data is prepared from one image data as such, the image capture section 101 of the portable terminal apparatus 100 requires to carry out image capture just once in a single shutter click, in a text image capture mode. Moreover, in this case, it is possible to omit the process of the aforementioned (3-3). Further, the portable terminal apparatus 100 just requires transmitting, as the high-resolution output data set, a set including one piece of captured image data obtained by a single image capture in a single shutter click.

(12-9) Items Determined by Captured Image Determination Section

According to the above description, the captured image determination section 102 determines (i) the skew and (ii) the geometric distortion of the image capture object in the captured image and (iii) an amount of offset of adjacent ones of the plurality of captured images, when the text image capture mode is selected. However, items which the captured image determination section 102 determines are not limited to the items (i) through (iii). Examples of modified items to be determined are described below.

For example, other items can be determined in addition to the above item. Examples of the other items include a brightness, a contrast, a color balance, and a blur (an intense camera shake).

As for a brightness, for example, in a case where overexposure occurs (the captured image is too bright) or underexposure occurs (the captured image is too dark), image capture may be required to be carried out again. In view of this, the captured image determination section 102 finds, for example, maximum and minimum ones of pixel values obtained in the sub-captured image data. In a case where the maximum value is not more than a given threshold (e.g., 100 in case of 8 bits), the captured image determination section 102 determines that underexposure occurs, and then supplies, to the control section 109, a determined result. In contrast, in a case where the minimum value is not less than a given threshold (e.g., 150 in case of 8 bits), the captured image determination section 102 determines that overexposure occurs, and then supplies, to the control section 109, a determined result. Then, in response to the determined result that underexposure or overexposure occurs, the control section 109 controls the display section 105 to display the determined result and an instruction urging image capture to be carried out again. Alternatively, the control section 109 changes the setting of the image capture section 101 so that the image capture section 101 has longer exposure time in the case of underexposure. In contrast, the control section 109 changes the setting of the image capture section 101 so that the image capture section 101 has shorter exposure time in the case of overexposure. Thereafter, the control section 109 can notify the user of the instruction urging image capture to be carried out again.

As for a contrast, in a case where a difference between the maximum and minimum values of the pixel values obtained in the sub-captured image data is not more than a given threshold, the captured image determination section 102 determines that the captured image has a poor contrast. Then, in response to a determined result that the captured image has a poor contrast, the control section 109 controls the display section 105 to display the determined result and an instruction urging image capture to be carried out again.

Note that the captured image determination section 102 can carry out the determination of a brightness and a contrast with respect to each of color channels or can use an average value (R+G+B/3) or a brightness value (0.299×R+0.587×G+ 0.114×B: conforming to NTSC).

As for a color balance, it is possible to detect an occurrence of an excessive imbalance in a given color channel by comparing average values of or maximum/minimum values of the respective color channels (R, G, and B). In view of this, the captured image determination section 102 determines that the captured image has a poor color balance, for example, in a case where (i) average values (Ra, Ga, and Ba) of the pixel values of the respective color channels which pixel values are obtained in the captured image data and have values in the vicinity of a maximum brightness value (in a range of maximum brightness to (maximum brightness—5)) are calculated, and (ii) a difference between the maximum value and the minimum value of average values (Ra, Ga, and Ba) of the respective color channels is not less than a corresponding given value [Max (Ra, Ga, and Ba)—Min (Ra, Ga, and Ba)>0.1×Max (Ra, Ga, and Ba)]. Then, in response to the determined result that the captured image has a poor color balance, the control section 109 causes the display section 105 to display the determined result and an instruction urging image capture to be carried out again.

As for a blur (an intense camera shake: a so-called motion blur), an edge of the captured image is less acute when the blur occurs. In view of this, the captured image determination section 102 prepares an edge intensity image by use of the edge extraction filter (see FIG. 8), and prepares a histogram so as to calculate a standard deviation of the histogram (a square root of the variance). In a case where the standard deviation is not more than a given threshold (e.g., 5), the captured image determination section 102 determines that a blur occurs in the captured image. Then, in response to a determined result of the determination that a blur occurs in the captured image, the control section 109 causes the display section 105 to display the determined result and an instruction urging image capture to be carried out again.

(12-10) Image Capture Section

The above description discusses an arrangement employing the fact that a camera shake, occurring when the image capture section 101 consecutively carries out image capture a plurality of times, causes offset of the plurality of captured images. However, the embodiment is not limited to this. Instead, the image capture section 101 can slightly displace an image capture device (CCD/CMOS) or a lens when consecutively carrying out the image capture the plurality of times. This securely causes offset of the plurality of captured images.

(12-11) Timing of Transmitting Image Data from Portable Terminal Apparatus to Image Output Apparatus According to the foregoing description, high resolution output data set that is image captured in the text image capture mode is stored in the portable terminal apparatus 100, and at a timing in which a transmission instruction is entered, high resolution output data sets accumulated until that point of time are transmitted all together. However, the timing to transmit the high resolution output data sets from the portable terminal apparatus 100 to the image output apparatus 200 is not limited to this.

For example, a high resolution output data set may be transmitted to the image output apparatus 200 every time image capture is carried out by the image capture section 101 in the text image capture mode and one high resolution output data set is obtained. With such a transmission process, the user is not located near the image output apparatus 200 in most cases. Hence, the communication section 104 of the portable terminal apparatus 100 sufficiently transmits the high resolution output data set to the image output apparatus 200 through a mobile phone network and the Internet.

(12-12) Output Process Information

The above description discusses an arrangement in which the portable terminal apparatus 100 obtains and transmits the output process information to the image output apparatus 200. However, the embodiment is not limited to this. The image output apparatus 200 can obtain the output process information (the information indicative of the kind of the output process and the setting requirement for the output process) when obtaining the user information so as to carry out the user certification.

(12-13) Output Process

Before carrying out the filing process or the e-mail transmission process, the control section 212 of the image output apparatus 200 can convert, to a high-compression PDF, the high resolution image data prepared by the image processing section 202. Note that the high-compression PDF refers to PDF data in which the image data is separated into a background part and a text part and optimum compression processes are carried out with respect to the respective parts. This allows favorable readability and a reduction in size of an image file.

Alternatively, before carrying out the filing process or the e-mail transmission process, the control section 212 can carry out an OCR (Optical Character Recognition) process with respect to the high resolution image data prepared by the image processing section 202 so as to prepare text data. The control section 212 can convert the high resolution image data to a PDF, and then add the text data to the PDF as a transparent text. Note that the transparent text is data for superimposing (embedding) a recognized text on (in) the image data as text information so that the recognized text is apparently invisible. For example, an image file in which a transparent text is added to image data is generally used in a PDF file. Then, the control section 212 can cause PDF data, to which the prepared transparent text is added, to be outputted. This allows an output of an electronic document easy to utilize as if it were a file in which a text search can be carried out.

(12-14) Image Processing Section of Image Output Apparatus

The above description discusses an arrangement in which the image processing section 202 of the image output apparatus 200 carries out corrections including the high resolution correction. Instead, the image output apparatus 200 can cause a server including an image processing section 202 to carry out, with respect to the high resolution output data set, the high resolution correction and the other image processing such as the geometric distortion correction, the lens distortion correction, the contrast correction, and the color balance correction. Note, in this case, that the server will serve as an image output apparatus for carrying out the high resolution correction with respect to the high resolution data output set received from the portable terminal apparatus 100, and for outputting the high resolution image data which has been subjected to the high resolution correction.

(13) Program and Recording Medium

The present invention can be achieved by recording, on a computer-readable recording medium in which a program to be executed by a computer is recorded, a method in which the image captured by the portable terminal apparatus 100 is transmitted to and outputted by the image output apparatus 200.

This makes it possible to portably provide a recording medium in which program codes (an executable program, an intermediate code program, and a source program) for carrying out the above process are recorded.

Note, in the present embodiment, that the recording medium can be a memory (not illustrated) such as a ROM or the recording medium itself can be a program medium (not illustrated) because the process is carried out by a microcomputer. Alternatively, the recording medium can be a program medium from which the program codes can be read out by carrying out loading of a recording medium with respect to a program reading device provided as an external storage apparatus (not illustrated).

In any case, an arrangement can be employed in which a stored program is executed by access of a microprocessor. Alternatively, in any case, a system can be employed in which the program codes are read out and downloaded on a program storage area (not illustrated) of the microcomputer, and then the program is executed. The program for the downloading is stored in a main body in advance.

Note here that the program medium is a recording medium which is arranged to be detachable from the main body. The program media can also be a medium fixedly bearing a program code which medium includes (i) a tape such as a magnetic tape or a cassette tape, (ii) a disk including a magnetic disk such as a flexible disk or a hard disk and an optical disk such as a CD-ROM, an MO, an MD, or a DVD, (iii) a card, such as an IC card (including a memory card) or an optical card, or (iv) a semiconductor memory of a mask ROM, EPROM (Erasable Programmable Read Only Memory), EEPROM (Electrically Erasable Programmable Read Only Memory), or a flash ROM.

Further, the present embodiment has a system architecture which is connectable to a communication network including the Internet. As such, the recording medium can be a medium which bears the program codes in a flexible manner so that the program code is downloaded from the communication network. Note that, in a case where the program is downloaded from the communication network as described above, the program for the downloading can be stored beforehand in the main body or can be installed from an alternative recording medium. Note that the present invention can also be realized in a form of a computer data signal in which the program code is embodied by an electronic transmission and which is embedded in carrier waves.

The recording medium is read by a program scanning device included in the portable terminal apparatus 100 or the image output apparatus 200, whereby the image processing method is carried out.

As described above, a captured image processing system of the present invention including (i) a portable terminal apparatus including an image capture section and (ii) an image output apparatus, the portable terminal apparatus and the image output apparatus being communicable with each other, is a captured image processing system including: a designation information accepting section for accepting entry of designation information from a user, the designation information being indicative of a location of a designation region which is a partial region of a captured image indicated by captured image data, the captured image data being obtained by carrying out image capture using the image capture section; an output target region determination section for determining an output target region in the captured image based on the designation information, the output target region being a region to be outputted from the image output apparatus; a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region; a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, the portable terminal apparatus including at least the designation information accepting section, and the image output apparatus including at least the corrected-data preparation section and the output section.

Moreover, an image outputting method of the present invention is an image outputting method in a captured image processing system including (i) a portable terminal apparatus including an image capture section and (ii) an image output apparatus, the portable terminal apparatus and the image output apparatus being communicable with each other, the image outputting method including: accepting entry of designation information from a user, the designation information being indicative of a location of a designation region which is a partial region of a captured image indicated by captured image data, the captured image data being obtained by carrying out image capture using the image capture section; determining an output target region in the captured image based on the designation information, the output target region being a region to be outputted from the image output apparatus; obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region; preparing corrected image data with respect to image data corresponding to the output target region in the captured image data, the corrected image data at least been subjected to coordinate conversion by use of the mapping prepared by the mapping preparation section; and outputting the corrected image data or an image indicated by the corrected image data, the portable terminal apparatus at least accepting the designation information, and the image output apparatus at least preparing the corrected image data and outputting the corrected image data or the image displayed based on the corrected image data.

According to the arrangement, the portable terminal apparatus includes the designation information accepting section. This allows the user to enter, to the portable terminal apparatus, a designated region which is a partial region in a captured image. By having the user enter a designated region, an output target region is determined based on the designated region, thereby allowing output of (i) corrected image data corresponding to the output target region or (ii) an image indicated by the corrected image data. Therefore, the user can easily obtain an image of the output target region cut out from the captured image, just by entering the designated region into the portable terminal apparatus.

Moreover, when carrying out image capture with respect to an image capture object of a rectangular shape such as a document or a poster, if image capture is carried out obliquely with respect to the image capture object, the image capture object is image captured having a distorted quadrangle shape in the captured image. On the other hand, when the image capture object is image captured from its front and with no skew, the image capture object becomes a rectangular region in the captured image, in which its upper and lower sides are substantially parallel to each other in a horizontal direction.

Further, according to the arrangement, a mapping is obtained with respect to a coordinate, for use in converting a quadrangle-shaped region to a rectangular region, which quadrangle-shaped region is a region in which four edge pixel groups detected in the captured image, which edge pixel groups are in the form of a line segment, serve as four sides of the region, and which rectangular region has a given size and has its upper and lower sides substantially parallel to each other in the horizontal direction.

Here, in a case where an image capture object of a rectangular shape such as a document or a poster is image captured, a boundary (edge line of the image capture object) in the captured image between the image capture object and its background is made up of four edge pixel groups each in the form of a line segment. Therefore, in a case where the image capture object of a rectangular shape is image captured, there is a high possibility that the quadrangle-shaped region having the four edge pixel groups detected in the captured image each in the form of a line segment serving as its sides is a region of the image capture object.

Thereafter, a mapping is obtained, which mapping is used for converting the quadrangle-shaped region detected as such to a rectangular region having a given size and having its upper and lower sides substantially parallel to each other in a horizontal direction. Therefore, even if the image capture object in the captured image is shown as a distorted quadrangle by carrying out image capture obliquely with respect to the image capture object of the rectangular shape, coordinate conversion by use of the mapping allows such a distorted quadrangle image capture object to be converted to a rectangular region having the given size and having its upper and lower sides substantially parallel to each other in the horizontal direction. As a result, it is possible to obtain an image as though the image capture object of the rectangular shape is image captured from its front. Namely, it is possible to obtain an image including no geometric distortion caused by carrying out image capture obliquely (an image in which geometric distortion is corrected).

As such, according to the arrangement, it is possible to realize a captured image processing system that is capable of easily outputting just a region required in an image captured by a portable terminal apparatus, and is capable of outputting an image having no geometric distortion even if image capture of an image capture object having a rectangular shape is carried out obliquely.

Moreover, in order to attain the object, a captured image processing system of the present invention including (i) a portable terminal apparatus including an image capture section and (ii) an image output apparatus, the portable terminal apparatus and the image output apparatus being communicable with each other, is a captured image processing system including: a designation information accepting section for accepting entry of designation information from a user, the designation information being indicative of a location of a designation region which is a quadrangle-shaped partial region of a captured image indicated by captured image data, the captured image data being obtained by carrying out image capture using the image capture section; an output target region determination section for determining an output target region in the captured image based on the designation information, the output target region being a quadrangle-shaped region to be outputted from the image output apparatus; a mapping preparation section for obtaining a mapping to be used to convert (a) the quadrangle-shaped output target region determined by the output target region determination section to (b) a rectangular region of a given size and having upper and lower sides of the rectangular region being substantially parallel in a horizontal direction, the mapping being used for converting coordinates of each of pixel electrodes within the output target region to coordinates of respective pixels in the rectangular region; a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, the portable terminal apparatus including at least the designation information accepting section, and the image output apparatus including at least the corrected-data preparation section and the output section.

Moreover, an image outputting method of the present invention is an image outputting method in a captured image processing system including (i) a portable terminal apparatus including an image capture section and (ii) an image output apparatus, the portable terminal apparatus and the image output apparatus being communicable with each other, the image outputting method including: accepting entry of designation information from a user, the designation information being indicative of a location of a designation region which is a quadrangle-shaped partial region of a captured image indicated by captured image data, the captured image data being obtained by carrying out image capture using the image capture section; determining an output target region in the captured image based on the designation information, the output target region being a quadrangle-shaped region to be outputted from the image output apparatus; obtaining a mapping to be used to convert (a) the quadrangle-shaped output target region determined by the output target region determination section to (b) a rectangular region of a given size and having upper and lower sides of the rectangular region being substantially parallel in a horizontal direction, the mapping being used for converting coordinates of each of pixel electrodes within the output target region to coordinates of respective pixels in the rectangular region; preparing corrected image data with respect to image data corresponding to the output target region in the captured image data, the corrected image data at least been subjected to coordinate conversion by use of the mapping prepared by the mapping preparation section; and outputting the corrected image data or an image indicated by the corrected image data, the portable terminal apparatus at least accepting the designation information, and the image output apparatus at least preparing the corrected image data and outputting the corrected image data or an image displayed based on the corrected image data.

According to this arrangement also, the portable terminal apparatus includes the designation information accepting section. This allows the user to enter to the portable terminal apparatus a designated region which is a partial region in the captured image. By receiving this entry, an output target region is determined based on the designated region. As a result, corrected image data just corresponding to the output target region or an image represented by the corrected image data is outputted. Therefore, the user is capable of easily attaining the image of the output target region cut out from the captured image, just by entering the designated region into the portable terminal apparatus.

Moreover, in a case where an image capture object of a rectangular shape including a text image such as a document or poster is image captured, the region designated by the user is often a region of the image capture object or a region of a graph or table in the text image of the image capture object. Such a region becomes image captured as a distorted quadrangle-shape in a case where the image capture is carried out obliquely with respect to the image capture object, however in the case where the image capture object is image captured from its front and without any skew, this region becomes a rectangular region having its upper and lower sides of the image capture object substantially parallel in a horizontal direction.

Further, according to the arrangement, a mapping is obtained, which mapping is used for converting the output target region to a rectangular region having a given size and having its upper and lower sides substantially parallel to each other in a horizontal direction. Therefore, even if the image capture object in the captured image is displayed as a distorted quadrangle by carrying out image capture obliquely with respect to the image capture object of the rectangular shape, coordinate conversion by use of the mapping allows such a distorted quadrangle image capture object to be converted to a rectangular region having the given size and having its upper and lower sides substantially parallel to each other in the horizontal direction. As a result, it is possible to obtain an image as though the image capture object of the rectangular shape is image captured from its front. Namely, it is possible to obtain an image including no geometric distortion caused by carrying out image capture obliquely.

As such, according to the arrangement, it is possible to realize a captured image processing system that is capable of easily outputting just a region required in an image captured by a portable terminal apparatus, and is capable of outputting an image having no geometric distortion even if image capture of an image capture object having a rectangular shape is carried out obliquely.

Furthermore, in the captured image processing system of the present invention, the portable terminal apparatus further includes: the output target region determination section; an image extraction section for cutting out, from the captured image data, designated region image data indicative of an image of the output target region determined by the output target region determination section; a correction information preparation section for detecting, from the captured image indicated by the captured image data, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region; and a transmission section for transmitting the designated region image data and correction information to the image output apparatus, and the image output apparatus further includes: a receiving section for receiving the designated region image data and the correction information, each of which is transmitted from the transmission section; and the mapping preparation section, the mapping preparation section obtaining the mapping based on the correction information received by the receiving section, and the corrected-data preparation section preparing the corrected image data by carrying out, by use of the mapping prepared by the mapping preparation section, coordinate conversion with respect to the designated region image data received by the receiving section.

According to the arrangement, in the portable terminal apparatus, an image extraction section cuts out designated region image data from the captured image data, which designated region image data is indicative of an image of the output target region. Therefore, it is possible to minimize the capacity of data to be transmitted from the portable terminal apparatus to the image output apparatus.

Moreover, in the captured image processing system of the present invention, the portable terminal apparatus further includes: the output target region determination section; and a transmission section for transmitting, to the image output apparatus, the captured image data and output target region information indicative of a location of the output target region determined by the output target region determination section, and the image output apparatus further includes: a receiving section for receiving the captured image data and the output target region information, each of which is transmitted from the transmission section; a correction information preparation section for detecting, from the captured image indicated by the captured image data that is received by the receiving section, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region; and the mapping preparation section, the mapping preparation section obtaining the mapping based on the correction information prepared by the correction information preparation section, and the corrected-data preparation section preparing the corrected image data by (i) cutting out, from the captured image data received by the receiving section, designated region image data indicative of an image of the output target region, the output target region being indicated by the output target region information received by the receiving section, and (ii) carrying out coordinate conversion to the designated region image data, by use of the mapping prepared by the mapping preparation section.

Moreover, in the captured image processing system of the present invention, the portable terminal apparatus further includes: the output target region determination section; and a transmission section for transmitting, to the image output apparatus, the captured image data and output target region information indicative of a location of the output target region determined by the output target region determination section, and the image output apparatus further includes: a receiving section for receiving the captured image data and the output target region information, each of which is transmitted from the transmission section; a correction information preparation section for detecting, from the captured image indicated by the captured image data that is received by the receiving section, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region having the edge pixel groups serving as its sides; and the mapping preparation section, the mapping preparation section obtaining the mapping based on the correction information prepared by the correction information preparation section, and the corrected-data preparation section preparing the corrected image data by (i) carrying out coordinate conversion based on the mapping prepared by the mapping preparation section, to the captured image data and the output target region information, each of which is received by the receiving section, and (ii) cutting out, from the captured image data to which the coordinate conversion is carried out, an output target region indicated by the output target region information to which the coordinate conversion processing is carried out.

According to the arrangement, the portable terminal apparatus does not need to carry out the cutout process of the output target region to the captured image data or the preparing process of the correction information. As a result, it is possible to reduce load given on the portable terminal apparatus.

Moreover, in the captured image processing system of the present invention, the portable terminal apparatus further includes: the output target region determination section; a correction information preparation section for detecting, from the captured image indicated by the captured image data, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region having the edge pixel groups serving as its sides; and a transmission section for transmitting, to the image output apparatus, the captured image data, output target region information indicative of a location of the output target region determined by the output target region determination section, and the correction information, and the image output apparatus further includes: a receiving section for receiving the captured image data, the output target region information and the correction information, each of which is transmitted by the transmission section; and the mapping preparation section, the mapping preparation section obtaining the mapping based on the correction information received by the receiving section, and the corrected-data preparation section preparing the corrected image data by (i) cutting out, from the captured image data received by the receiving section, designated region image data indicative of an image of the output target region, the output target region being indicated by the output target region information received by the receiving section, and (ii) carrying out coordinate conversion to the designated region image data, by use of the mapping prepared by the mapping preparation section.

Moreover, in the captured image processing system of the present invention, the portable terminal apparatus further includes: the output target region determination section; a correction information preparation section for detecting, from the captured image indicated by the captured image data, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region having the edge pixel groups serving as its sides; and a transmission section for transmitting, to the image output apparatus, the captured image data, output target region information indicative of a location of the output target region determined by the output target region determination section, and the correction information, and the image output apparatus further includes: a receiving section for receiving the captured image data, the output target region information and the correction information, each of which is transmitted by the transmission section; and the mapping preparation section, the mapping preparation section obtaining the mapping based on the correction information received by the receiving section, and the corrected-data preparation section preparing the corrected image data by (i) carrying out coordinate conversion based on the mapping prepared by the mapping preparation section, to the captured image data and the output target region information, each of which is received by the receiving section, and (ii) cutting out, from the captured image data to which the coordinate conversion is carried out, an output target region indicated by the output target region information to which the coordinate conversion processing is carried out.

According to the arrangement, there is no need for the portable terminal apparatus to carry out the cutout process of the output target region from the captured image data. This reduces the load given on the portable terminal apparatus.

Furthermore, in the captured image processing system of the present invention, the designation information accepting section accepts, as the designation information, information indicative of locations of four designated points that serve as angular points of the designated region having a quadrangle shape, and the output target region determination section (i) determines, for each of the four designated points accepted by the designation information accepting section, whether or not a plurality of edge pixels connected to form a given shape including one corner section is included in a respective one of blocks of the captured image, the blocks being of a given size and containing a respective one of the designated points, and in a case where the block includes the plurality of edge pixels, a point in the corner section is determined as a respective corrected point, and in a case where the block includes no plurality of the edge pixels, the respective one of the designated points is determined as the respective corrected point, and (ii) determines a quadrangle-shaped region having the four corrected points serving as its angular points, as the output target region.

Generally, portable terminal apparatuses are designed to have a relatively small size in view of them being carried around, and often have a small screen in its display section. Therefore, it is difficult to accurately enter, as designated points, the angular points of the output target region. As a result, it is considered that a region off a desired output target region is designated as the designated region.

On the other hand, a region selected by the user as the output target region may be an entire image capture object of a rectangular shape or may be a table or a graph in the image capture object. An outline of such regions is a boundary between the image capture object and the background or is a closing line of the table or the graph. This is constituted by edge pixels in the captured image.

According to the arrangement, determination is made inside the captured image, for each designated point accepted by the designation information accepting section, on whether or not a plurality of edge pixels that are connected to form a given shape having a corner section is included in a block of a given size including the designated point. If a plurality of edge pixels is included within the block, a point at the corner section is determined as a corrected point, and if no plurality of edge pixels exists inside the block, the designated point is determined as the corrected point. Accordingly, the determined four corrected points serve as angular points, and a quadrangle region having the four angular points is determined as the output target region.

Therefore, even in a case where a point at a location slightly off a corner section of the closed line or the boundary is designated on the screen of the display section of the portable terminal apparatus although the user desires to select a region surrounded by a closed line or a boundary, it is possible to select a pixel constituting the corner section of the closed line or the boundary as an angular point of the output target region. As a result, even if the user cannot enter the designated point accurately, an image of their desired output target region is obtainable by designating a point being close to some extent.

Furthermore, in the captured image processing system of the present invention, the corrected-data preparation section may prepare, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

According to the arrangement, it is possible to improve readability of characters and output a high quality image.

Furthermore, the captured image processing system of the present invention preferably includes a display section for displaying the output target region.

According to the arrangement, the user can check the output target region by looking at the display section. In a case where the checked output target region is not what is desired, this arrangement allows the user to cause the output target region determination section to redetermine the output target region. Moreover, the user can select a desired output target region among output target regions determined by use of various methods.

Furthermore, the captured image processing system of the present invention further preferably includes an editing processing section for editing the output target region in accordance with an entry by the user with respect to the output target region displayed on the display section.

According to the arrangement, if the output target region displayed on the display section is not the desired region, the user may edit the output target region by use of the editing processing section.

Note that the captured image processing system may be realized by a computer. In this case, a program that causes a computer to function as each of the sections of the captured image processing system, and a computer-readable recording medium in which the program is recorded is also included in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a captured image processing system for carrying out data communication between a portable terminal apparatus and an image output apparatus.

REFERENCE SIGNS 100 portable terminal apparatus
200 image output apparatus
101 image capture section
102 captured image determination section (corrected information generation section)
103 image processing section
104 communication section (transmission section)
105 display section
106 input section
107 recording medium accessing section
108 storage section
109 control section (transmission section)
110 correction information generation section
111 designation information accepting section
112 region determination section (output target region determination section)
113 region extraction section (image extraction section)
114 editing processing section
201 image scanning section
202 image processing section (corrected data generation section)
203 certifying section
204 image forming section
205 display section
206 input section
207 first communication section (receiving section)
208 second communication section
209 recording medium accessing section
210 storage section
212 control section
221 image quality adjustment section (corrected data generation section)
222 geometric correction section (mapping generation section, corrected data generation section),
223 lens distortion correction section (mapping generation section, corrected data generation section)
224 output image processing section (corrected data generation section
225 high resolution correction section (corrected data generation section)

What is claimed is:

1. A captured image processing system including (i) a portable terminal apparatus including an image capture section and (ii) an image output apparatus, the portable terminal apparatus and the image output apparatus being communicable with each other, said captured image processing system comprising:

a designation information accepting section for accepting entry of designation information from a user, the designation information being indicative of a location of a designation region which is a partial region of a captured image indicated by captured image data, the captured image data being obtained by carrying out image capture using the image capture section;

an output target region determination section for determining an output target region in the captured image based on the designation information, the output target region being a region to be outputted from the image output apparatus;

a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region;

a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, wherein the portable terminal apparatus includes:
the designation information accepting section;
the output target region determination section;
an image extraction section for cutting out, from the captured image data, designated region image data indicative of an image of the output target region determined by the output target region determination section;
a correction information preparation section for detecting, from the captured image indicated by the captured image data, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region; and a transmission section for transmitting the designated region image data and correction information to the image output apparatus, and the image output apparatus includes:
the corrected-data preparation section;
the output section;
the mapping preparation section; and
a receiving section for receiving the designated region image data and the correction information, each of which is transmitted from the transmission section, the mapping preparation section obtaining the mapping based on the correction information received by the receiving section, and the corrected-data preparation section preparing the corrected image data by carrying out, by use of the mapping prepared by the mapping preparation section, coordinate conversion with respect to the designated region image data received by the receiving section.

2. The captured image processing system according to claim 1, wherein:
the corrected-data preparation section prepares, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

3. The captured image processing system according to claim 1, further comprising:
a display section for displaying the output target region.

4. A captured image processing system including (i) a portable terminal apparatus including an image capture section and (ii) an image output apparatus, the portable terminal apparatus and the image output apparatus being communicable with each other, said captured image processing system comprising:

a designation information accepting section for accepting entry of designation information from a user, the designation information being indicative of a location of a designation region which is a partial region of a captured image indicated by captured image data, the captured image data being obtained by carrying out image capture using the image capture section;

an output target region determination section for determining an output target region in the captured image based on the designation information, the output target region being a region to be outputted from the image output apparatus;

a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region;

a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, wherein the portable terminal apparatus includes:
the designation information accepting section;
the output target region determination section; and
a transmission section for transmitting, to the image output apparatus, the captured image data and output target region information indicative of a location of the output target region determined by the output target region determination section, and the image output apparatus includes:
the corrected-data preparation section:
the output section;
the mapping preparation section;
a receiving section for receiving the captured image data and the output target region information, each of which is transmitted from the transmission section; and a correction information preparation section for detecting, from the captured image indicated by the captured image data that is received by the receiving section, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region, the mapping preparation section obtaining the mapping based on the correction information prepared by the correction information preparation section, and the corrected-data preparation section preparing the corrected image data by (i) cutting out, from the captured image data received by the receiving section, designated region image data indicative of an image of the output target region, the output target region being indicated by the output target region information received by the receiving section, and (ii) carrying out coordinate conversion to the designated region image data, by use of the mapping prepared by the mapping preparation section.

5. The captured image processing system according to claim 4, wherein:
the corrected-data preparation section prepares, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

6. The captured image processing system according to claim 4, further comprising:
a display section for displaying the output target region.

7. A captured image processing system including (i) a portable terminal apparatus including an image capture section and (ii) an image output apparatus, the portable terminal apparatus and the image output apparatus being communicable with each other, said captured image processing system comprising:

a designation information accepting section for accepting entry of designation information from a user, the designation information being indicative of a location of a designation region which is a partial region of a captured image indicated by captured image data, the captured image data being obtained by carrying out image capture using the image capture section;

an output target region determination section for determining an output target region in the captured image based on the designation information, the output target region being a region to be outputted from the image output apparatus;

a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region;

a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, wherein the portable terminal apparatus includes:
 the designation information accepting section;
 the output target region determination section; and
 a transmission section for transmitting, to the image output apparatus, the captured image data and output target region information indicative of a location of the output target region determined by the output target region determination section, and the image output apparatus includes:
 the corrected-data preparation section;
 the output section;
 the mapping preparation section;
 a receiving section for receiving the captured image data and the output target region information, each of which is transmitted from the transmission section; and
 a correction information preparation section for detecting, from the captured image indicated by the captured image data that is received by the receiving section, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region having the edge pixel groups serving as its sides,
 the mapping preparation section obtaining the mapping based on the correction information prepared by the correction information preparation section, and
 the corrected-data preparation section preparing the corrected image data by (i) carrying out coordinate conversion based on the mapping prepared by the mapping preparation section, to the captured image data and the output target region information, each of which is received by the receiving section, and (ii) cutting out, from the captured image data to which the coordinate conversion is carried out, an output target region indicated by the output target region information to which the coordinate conversion processing is carried out.

8. The captured image processing system according to claim 7, wherein:

the corrected-data preparation section prepares, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

9. The captured image processing system according to claim 7, further comprising:

a display section for displaying the output target region.

10. A captured image processing system including (i) a portable terminal apparatus including an image capture section and (ii) an image output apparatus, the portable terminal apparatus and the image output apparatus being communicable with each other, said captured image processing system comprising:

a designation information accepting section for accepting entry of designation information from a user, the designation information being indicative of a location of a designation region which is a partial region of a captured image indicated by captured image data, the captured image data being obtained by carrying out image capture using the image capture section;

an output target region determination section for determining an output target region in the captured image based on the designation information, the output target region being a region to be outputted from the image output apparatus;

a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region;

a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, wherein the portable terminal apparatus includes:
 the designation information accepting section;
 the output target region determination section;
 a correction information preparation section for detecting, from the captured image indicated by the captured image data, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region having the edge pixel groups serving as its sides; and
 a transmission section for transmitting, to the image output apparatus, the captured image data, output target region information indicative of a location of the output target region determined by the output target region determination section, and the correction information, and the image output apparatus includes:
the corrected-data preparation section;
the output section;
the mapping preparation section; and
a receiving section for receiving the captured image data, the output target region information and the correction information, each of which is transmitted by the transmission section,
the mapping preparation section obtaining the mapping based on the correction information received by the receiving section, and
the corrected-data preparation section preparing the corrected image data by (i) cutting out, from the captured image data received by the receiving section, designated region image data indicative of an image of the output target region, the output target region being indicated by the output target region information received by the receiving section, and (ii) carrying out coordinate conversion to the designated region image data, by use of the mapping prepared by the mapping preparation section.

11. The captured image processing system according to claim 10, wherein:
the corrected-data preparation, section prepares, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

12. The captured image processing system according to claim 10, further comprising:
a display section for displaying the output target region.

13. A captured image processing system including (i) a portable terminal apparatus including an image capture section and (ii) an image output apparatus, the portable terminal apparatus and the image output apparatus being communicable with each other, said captured image processing system comprising:
a designation information accepting section for accepting entry of designation information from a user, the designation information being indicative of a location of a designation region which is a partial region of a captured image indicated by captured image data, the captured image data being obtained by carrying out image capture using the image capture section;
an output target region determination section for determining an output target region in the captured image based on the designation information, the output target region being a region to be outputted from the image output apparatus;
a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region;
a corrected-data preparation section for preparing corrected image data with respect to image data corresponding to the output target region in the captured image data, the corrected image data at least been subjected to coordinate conversion by use of the mapping prepared by the mapping preparation section; and
an output section for outputting the corrected image data or an image indicated by the corrected image data, wherein
the portable terminal apparatus includes:
the designation information accepting section;
the output target region determination section;
a correction information preparation section for detecting, from the captured image indicated by the captured image data, the quadrangle-shaped region having four edge pixel groups, detected in the captured image, serving as sides of the quadrangle-shaped region, the four edge pixel groups each being in the form of a line segment, in order to prepare correction information indicative of a location of the quadrangle-shaped region having the edge pixel groups serving as its sides; and
a transmission section for transmitting, to the image output apparatus, the captured image data, output target region information indicative of a location of the output target region determined by the output target region determination section, and the correction information, and
the image output apparatus includes:
the corrected-data preparation section:
the output section;
the mapping preparation section; and
a receiving section for receiving the captured image data, the output target region information and the correction information, each of which is transmitted by the transmission section,
the mapping preparation section obtaining the mapping based on the correction information received by the receiving section, and
the corrected-data preparation section preparing the corrected image data by (i) carrying out coordinate conversion based on the mapping prepared by the mapping preparation section, to the captured image data and the output target region information, each of which is received by the receiving section, and (ii) cutting out, from the captured image data to which the coordinate conversion is carried out, an output target region indicated by the output target region information to which the coordinate conversion processing is carried out.

14. The captured image processing system according to claim 13, wherein:
the corrected-data preparation section prepares, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

15. The captured image processing system according to claim 13, further comprising:
a display section for displaying the output target region.

16. A captured image processing system including (i) a portable terminal apparatus including an image capture section and (ii) an image output apparatus, the portable terminal apparatus and the image output apparatus being communicable with each other, said captured image processing system comprising:
a designation information accepting section for accepting entry of designation information from a user, the designation information being indicative of a location of a designation region which is a partial region of a captured image indicated by captured image data, the captured image data being obtained by carrying out image capture using the image capture section;

an output target region determination section for determining an output target region in the captured image based on the designation information, the output target region being a region to be outputted from the image output apparatus;

a mapping preparation section for obtaining a mapping to be used to convert (a) a quadrangle-shaped region having four edge pixel groups, detected in the captured image, serving as sides of the quadrangle-shaped region, the four edge pixel groups each being in a form of a line segment, to (b) a rectangular region of a given size and having upper and lower sides of the rectangular region being substantially parallel in a horizontal direction, the mapping being used for converting coordinates of each pixel within the quadrangle-shaped region to coordinates of respective pixels in the rectangular region;

a corrected-data preparation section for preparing corrected image data with respect to image data corresponding to the output target region in the captured image data, the corrected image data at least been subjected to coordinate conversion by use of the mapping prepared by the mapping preparation section; and an output section for outputting the corrected image data or an image indicated by the corrected image data, the portable terminal apparatus including at least the designation information accepting section, and the image output apparatus including at least the corrected-data preparation section and the output section, wherein the designation information accepting section accepts, as the designation information, information indicative of locations of four designated points that serve as angular points of the designated region having a quadrangle shape, and the output target region determination section (i) determines, for each of the four designated points accepted by the designation information accepting section, whether or not a plurality of edge pixels connected to form a given shape including one corner section is included in a respective one of blocks of the captured image, the blocks being of a given size and containing a respective one of the designated points, and in a case where the block includes the plurality of edge pixels, a point in the corner section is determined as a respective corrected point, and in a case where the block includes no plurality of the edge pixels, the respective one of the designated points is determined as the respective corrected point, and (ii) determines a quadrangle-shaped region having the four corrected points serving as its angular points, as the output target region.

17. The captured image processing system according to claim 16, wherein:

the corrected-data preparation section prepares, with respect to image data corresponding to the output target region in the captured image data, corrected image data that has been subjected to (i) coordinate conversion based on mapping prepared by the mapping preparation section and (ii) high resolution correction, the high resolution correction correcting a resolution of the captured image data to a higher resolution.

18. The captured image processing system according to claim 16, further comprising:

a display section for displaying the output target region.

* * * * *